(12) United States Patent  (10) Patent No.: US 8,144,761 B2
Nakasha  (45) Date of Patent: Mar. 27, 2012

(54) PULSE TRANSMISSION METHOD, PULSE TRANSMISSION SYSTEM, TRANSMITTER, AND RECEIVER

(75) Inventor: Yasuhiro Nakasha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 12/238,952

(22) Filed: Sep. 26, 2008

(65) Prior Publication Data

US 2009/0129460 A1 May 21, 2009

(30) Foreign Application Priority Data

Sep. 28, 2007 (JP) ................................. 2007-255426

(51) Int. Cl.
*H04L 27/00* (2006.01)
(52) U.S. Cl. ........ 375/238; 375/239; 375/295; 375/316; 398/189; 398/42; 398/48; 398/115; 370/537; 332/106; 332/112
(58) Field of Classification Search .................. 375/238, 375/295, 316; 398/189, 42, 48, 115; 370/537
See application file for complete search history.

(56) References Cited

U.S. PATENT DOCUMENTS

| 5,394,410 | A | * | 2/1995 | Chen | 714/823 |
| 7,187,715 | B2 | * | 3/2007 | Balachandran et al. | 375/242 |
| 2004/0175173 | A1 | * | 9/2004 | Deas | 398/42 |
| 2007/0092264 | A1 | * | 4/2007 | Suzuki et al. | 398/189 |
| 2007/0092265 | A1 | * | 4/2007 | Vrazel et al. | 398/189 |
| 2007/0206950 | A1 | * | 9/2007 | Liu et al. | 398/115 |
| 2007/0297487 | A1 | * | 12/2007 | Mimura et al. | 375/130 |

FOREIGN PATENT DOCUMENTS

| JP | 2001-111634 A | 4/2001 |
| JP | 2003-521143 A | 7/2003 |
| WO | WO 01/43386 A1 | 6/2001 |

* cited by examiner

*Primary Examiner* — Chieh Fan
*Assistant Examiner* — Siu Lee
(74) *Attorney, Agent, or Firm* — Arent Fox LLP

(57) ABSTRACT

A pulse transmission method for transmitting data by using pulse signals, each having a predetermined pulse width; defining a symbol time at least N times the predetermined pulse width, N being at least 2; defining a basic delay time calculated by dividing the predetermined pulse width by a predetermined integer; placing the pulse signals in the symbol time by delaying the pulse signals by an integral multiple of the basic delay time from start of the symbol time, the number of the pulse signals being k and $0 \leq k \leq N$ being satisfied; and transmitting the pulse signals.

19 Claims, 31 Drawing Sheets

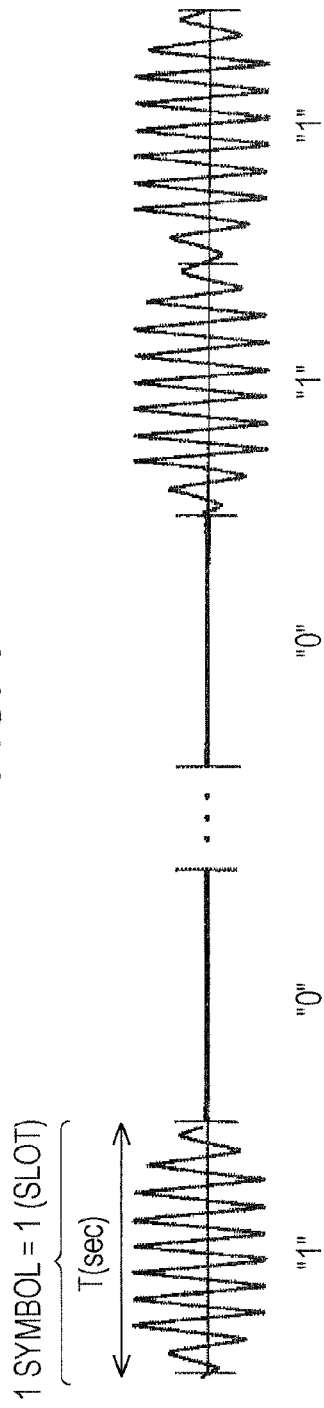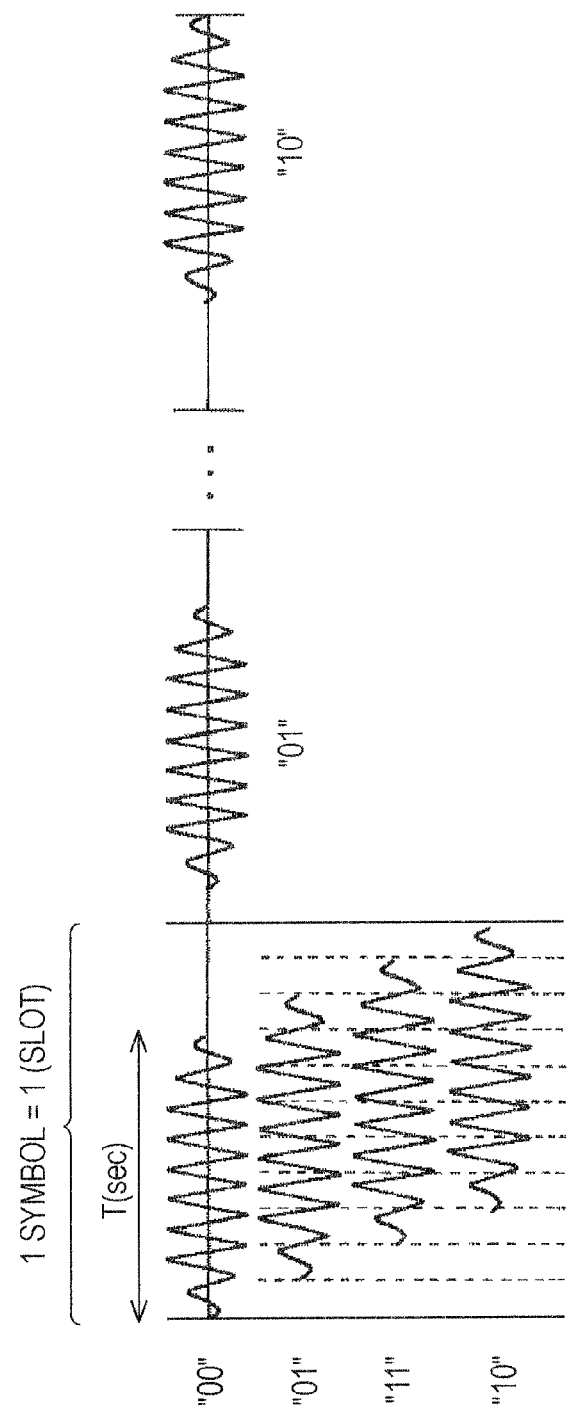

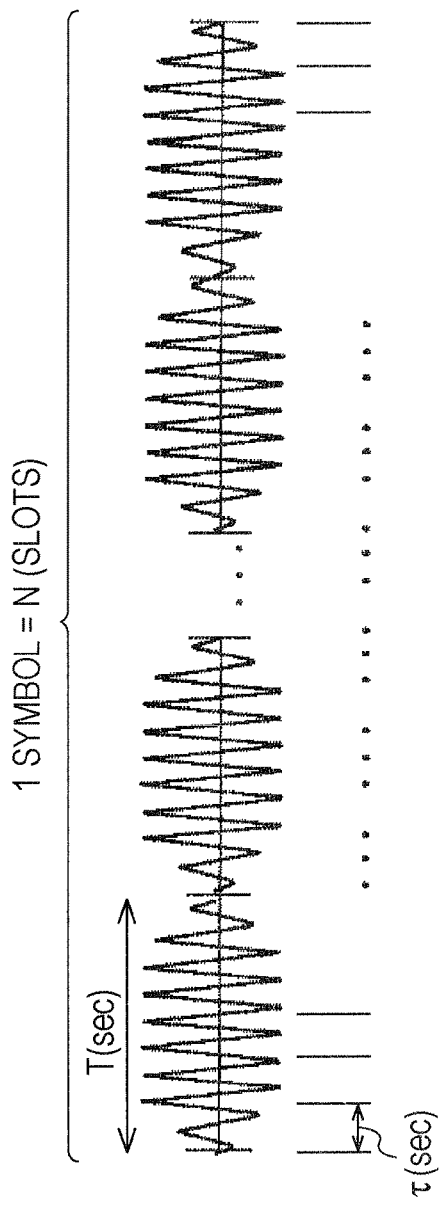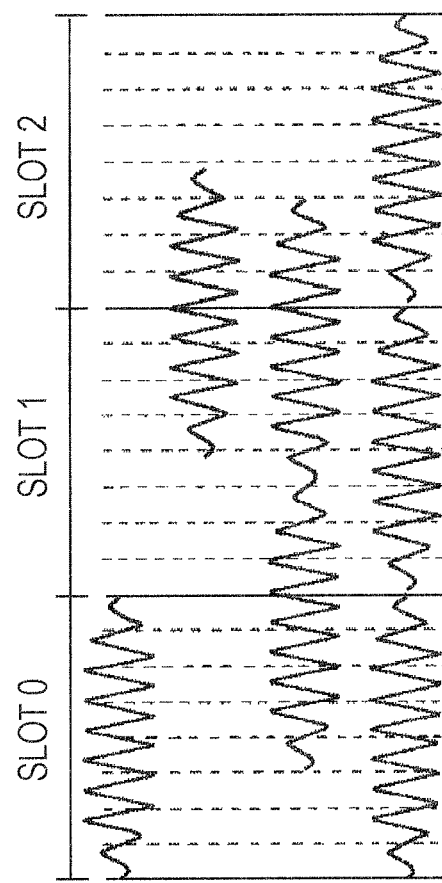

| S08 | S18 | S28 | S0C2 | S1C2 | S2C2 | T0 | T1 | T2 | Load_low |
|---|---|---|---|---|---|---|---|---|---|
| 0 | 0 | 0 | × | × | × | 0 | 0 | 0 | 0 |
| 0 | 0 | 1 | × | × | 0 | 0 | 0 | 0 | 0 |
| 0 | 1 | 0 | × | 0 | × | 0 | 0 | 0 | 0 |
| 0 | 1 | 0 | × | 1 | × | 0 | 1 | 1 | 0 |
| 0 | 1 | 1 | × | 0 | 0 | 0 | 0 | 0 | 0 |
| 1 | 0 | 0 | 0 | × | × | 0 | 0 | 0 | 0 |
| 1 | 0 | 0 | 1 | × | × | 1 | 1 | 1 | 1 |
| 1 | 0 | 1 | 0 | × | 0 | 0 | 0 | 0 | 0 |
| 1 | 0 | 1 | 1 | × | 0 | 1 | 1 | 0 | 1 |
| 1 | 1 | 0 | 0 | 0 | × | 0 | 0 | 0 | 0 |
| 1 | 1 | 0 | 0 | 1 | × | 0 | 1 | 1 | 1 * |
| 1 | 1 | 0 | 1 | 1 | × | 1 | 1 | 1 | 1 |
| 1 | 1 | 1 | 0 | 0 | 0 | 0 | 0 | 0 | 0 |

PULSE WIDTH

PULSE TRANSMISSION METHOD, PULSE TRANSMISSION SYSTEM, TRANSMITTER, AND RECEIVER

CROSS-REFERENCE TO RELATED APPLICATIONS

This application is based upon and claims the benefit of priority from the prior Japanese Patent Application No. 2007-255426, filed on Sep. 28, 2007, the entire contents of which are incorporated herein by reference.

BACKGROUND

1. Field

The present invention relates to a pulse transmission method and a pulse transmission system to transmit/receive data by using a pulse of a predetermined pulse width, and to a transmitter and a receiver used for such a transmission system.

2. Description of the Related Art

A pulse transmission is a wired or a wireless transmission using a pulse signal of a very small pulse width as a transmission medium, and is expected to be applied to a wideband radio communication system or the like.

A basic technique of conventional pulse radio transmission, as shown in FIG. 1, is ON/OFF modulation of transmitting information (data) based on presence/absence of a pulse. When time T occupied by a single pulse is called one slot, the presence/absence of a pulse in the slot serves as an information medium. In addition to the ON/OFF modulation, similar binary modulation/demodulation includes a modulation technique of inverting the polarity (+/−) or phase (0°/180°) of a pulse in accordance with data 1 or data 0. When such pulse modulation techniques are used, a maximum bit rate of transmission per unit time is 1/T. Since the necessary frequency bandwidth is 1/T, modulation efficiency defined as a ratio between the maximum bit rate and the necessary frequency bandwidth is 1.

On the other hand, in a carrier radio transmission method using carrier waves instead of pulse signals, multilevel modulation techniques capable of increasing modulation efficiency to the maximum of 2, 4, and 8, respectively, have been adopted, e.g., Quadrature Phase Shift keying (QPSK), 16 Quadrature Amplitude Modulation (16QAM), and 256 Quadrature Amplitude Modulation (256QAM). The pulse radio transmission is requested to increase modulation efficiency to the same extent as carrier radio transmission.

In the pulse radio transmission, a representative multilevel modulation technique that is being discussed to increase modulation efficiency is Pulse Position Modulation (PPM). PPM is described in PCT Japanese Translation Patent Publication No. 2003-521143 and Japanese Unexamined Patent Application Publication No. 2001-111634, for example. PPM is characterized in delaying generation of a pulse by delay time according to a data series. Here, basic delay time which is a basic unit of delay time is called "PPM quantization time".

FIG. 2 illustrates an example of binary PPM in the case where a pulse slot is divided into eight segments. In PPM, pulse generation time is delayed. Therefore, the time that should be obtained to transmit all data series (symbol length) is extended by the delay time. For example, in PPM where a pulse slot is divided into four segments, it is required to obtain (3/4)·T in addition to the pulse slot T in order to transmit four data series ((0, 0), (0, 1), (1, 0), and (1, 1)). Thus, the symbol length is extended to T·(7/4). As a result, a maximum transmission bit rate is 2×(1/T·(7/4))=1.14/T. In this case, improvement in modulation efficiency is smaller relative to the ON/OFF modulation.

In the case of ternary PPM, pulse generation time is delayed by τ×(22·n1+21·n2+n3) with respect to data series (n1, n2, n3). Here, τ=T/23. That is, a pulse slot is divided into eight segments and pulse generation time is changed in accordance with a state of the data series (n1, n2, n3). Thus, the symbol length is extended to T·(15/8) and a maximum transmission bit rate is 3×(1/T·(15/8))=1.6/T. As can be understood, improvement in modulation efficiency is less than double relative to the ON/OFF modulation.

Modulation efficiency of PPM is described below in a more generalized manner. In conventional n-valued PPM, 1 symbol time is defined as the sum of "time T of a Wave Packet" and "total time of a continuous no-signal group (2n−1)·τ" placed before/after time T. Thus, 1 symbol time is expressed by the following expression (1).

$$1 \text{ symbol time} = T + (2n-1) \cdot \tau \tag{1}$$

Here "n" represents multiplicity and "τ" represents PPM quantization time. The PPM position number 2n is a total amount of information (=total number of states). Conventional PPM efficiency is expressed by the following expression (2).

$$\text{Modulation efficiency} = (n/T + (2n-1)\cdot\tau)/(1/T) = n/(1 + (2n-1)\cdot\tau/T) \tag{2}$$

Accordingly, an effective bit rate does not increase for multiplicity with respect to (1/T) in the ON/OFF modulation method.

SUMMARY

An aspect of the present invention includes a pulse transmission method for transmitting data by using pulse signals, each having a predetermined pulse width, defining a symbol time N times or more the predetermined pulse width, where N is at least 2; defining a basic delay time calculated by dividing the predetermined pulse width by a predetermined integer; placing the pulse signals in the symbol time by delaying the pulse signals by an integral multiple of the basic delay time from start of the symbol time, the number of the pulse signals being k and $0 \leq k \leq N$ being satisfied; and transmitting the pulse signals.

BRIEF DESCRIPTION OF THE DRAWINGS

FIG. 1 illustrates a conventional pulse transmission method;

FIG. 2 illustrates another conventional pulse transmission method;

FIGS. 3A and 3B illustrate a pulse transmission method according to the present invention;

FIGS. 8A and 8B illustrate truth value tables used for a process performed by an encoding unit of the transmitter according to the present invention;

FIGS. 20A and 20B illustrate truth value tables used for a process performed by a decoding unit of the receiver according to the present invention;

DESCRIPTION OF THE PREFERRED EMBODIMENTS

Figure 4:
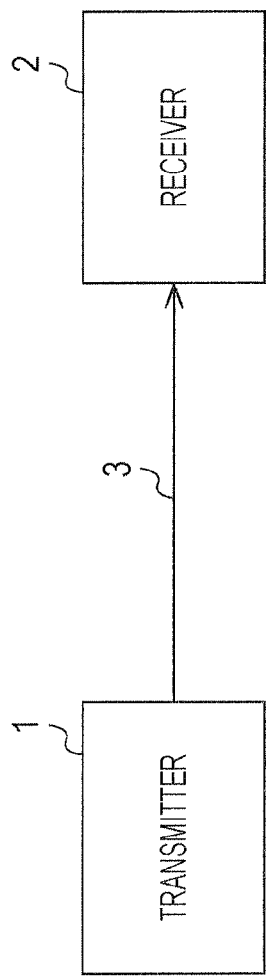
FIG. 4 illustrates a configuration of a pulse transmission system according to the present invention.

In the present invention, 1 symbol time may be N ($2 \leq N$) times or more the pulse width T of a pulse signal. For example, 1 symbol time=3.4T is acceptable. However, a description is given here on the assumption that 1 symbol time is an integral multiple of the pulse width T of a pulse signal for simplicity.

FIGS. 3A and 3B illustrate a pulse transmission method according to the present invention. FIG. 3A illustrates 1 symbol length (N·T) in the pulse transmission method according to the present invention. FIG. 3B illustrates an example of signals in the case where 1 symbol length is three times the pulse width of a pulse signal (3 slots).

As illustrated in FIG. 3A, time N·T corresponding to N waves of Wave packet of pulse width T is defined as 1 symbol time. Thus, 1 symbol time is expressed by the following expression (3).

$$1 \text{ symbol time} = N \cdot T \qquad (3)$$

As illustrated in FIG. 3B, generation of states in 1 symbol time is performed by placing waves (pulse signals) in 1 symbol time in quantization time τ, the number of the waves being k ($0 \leq k \leq N$).

On the other hand, 1 symbol time can also be expressed by the following expression (4) as the sum of:

(1) time kT of k continuous waves; and
(2) "total time of continuous no-signal group (N−k)T" placed before/after the k continuous waves and in (k+1) intermediate areas.

$$1 \text{ symbol time} = kT + (N-k)T \qquad (4)$$

Here, a calculation result obtained by dividing "total time of continuous no-signal group (N-k)T" by quantization time τ, that is, (N−k)/(T/τ), is called the number of sub-slots. The number of combinations of placing the number of sub-slots in the (k+1) areas is the number of states of the k continuous waves. By calculating the number of states for each of k=0 to k=N and adding those numbers, a total number of states can be obtained. The total number of states STOTAL can be expressed by the following general expression (5).

$$S_{TOTAL} = \sum_{k=0}^{N} (N-k)T/\tau_k + {}_kC_k \qquad (5)$$

A maximum bit rate BMAX can be expressed by the following expression (6).

$$BAMX = (\log 2 STOTAL)/NT \qquad (6)$$

Modulation efficiency ηMAX can be expressed by the following expression (7).

$$\eta MAX = (\log 2 STOTAL)/N \qquad (7)$$

For example, when k=0, the number of states of placement of the continuous no-signal group is 1.

When k=1, a sub-slot of any of 0, 1, ..., (N−1) (T/τ) can be placed before the continuous wave, and thus the number is from m=0 to (N−1) (T/τ), and the number of states is (N−1)(T/τ)+1.

When k=2 or more, the number of states can be obtained by counting the states where sub-slots can be placed in the period before "first continuous wave", the period between "first continuous wave" and "second continuous wave", and the period between "second continuous wave" and "third continuous wave". That is, the number of states in which k corresponding to the combination of expression (5) is obtained.

Here, when N=3 and T/τ=8, the number of states of k=0 is 1; the number of states of k=1 is 17; the number of states of k=2 is 45; and the number of states of k=3 is 1. Accordingly, the total number of states is 64 (corresponding to 6 bits). Since three pulse slots area used, an effective bit rate is 6/3·(1/T)=2·(1/T).

As described above, in the modulation/demodulation method according the present invention, a maximum effective bit rate can be improved by 2/1.6=1.25 times when N=3 and (T/τ)=8, compared to a maximum effective bit rate of 1.6/T when (T/τ)=8 in the conventional ternary PPM. Compared to the ON/OFF modulation method, double the modulation efficiency can be realized.

Hereinafter, an embodiment of applying the present invention to a pulse transmission system of an 80-90 GHz band is described.

FIG. 4 illustrates a configuration of a transmission system according to the embodiment of the present invention. As illustrated in FIG. 4, the transmission system includes a transmitter 1, a receiver 2, and a transmission path 3. The transmission path according to the embodiment is a radio transmission path, but a wired transmission path can also be used. In the embodiment, pulse signals are transmitted from the transmitter 1 to the receiver 2 through the transmission path 3 in the method described above with reference to FIGS. 3A and 3B. The bit rate of transmitting data is 10 Gbps, the slot time is 100 ps, the number of slots N is 3, and the sub-slot period τ is T/8. 1 symbol length corresponds to three slots, that is, 300 ps.

Figure 5:
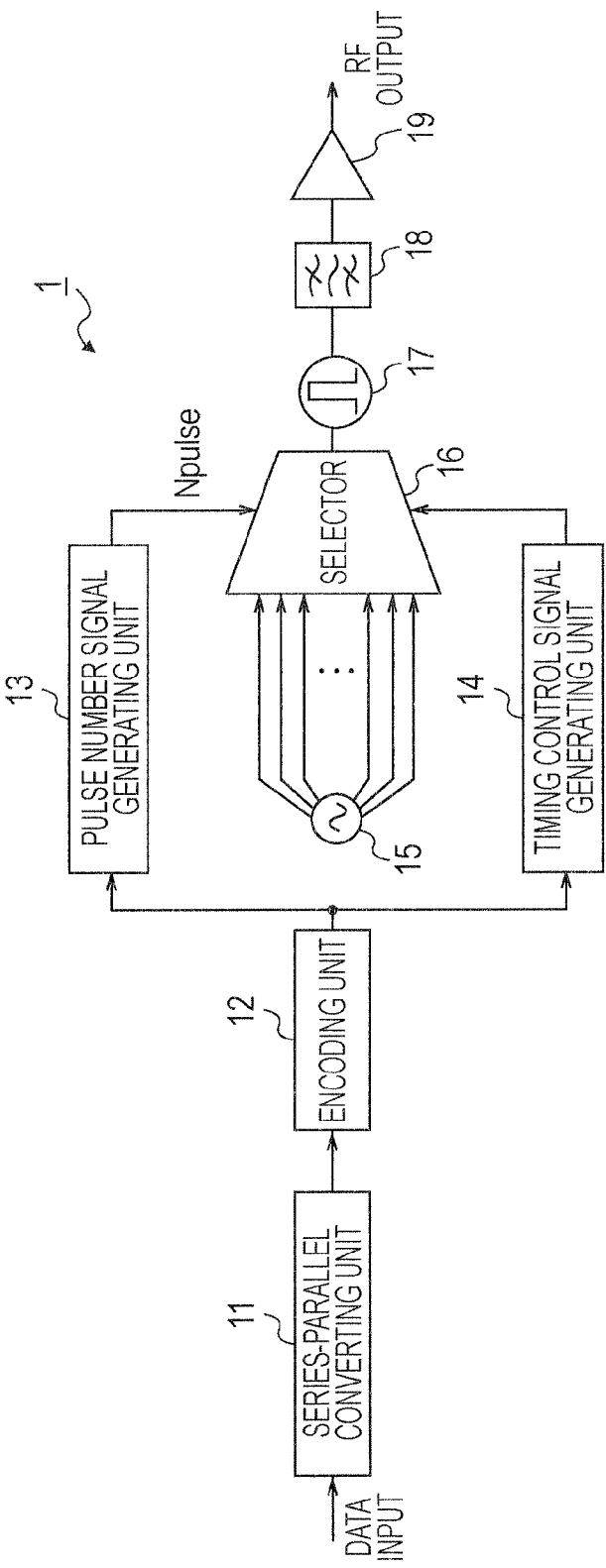
FIG. 5 illustrates a configuration of a transmitter of the pulse transmission system according to the present invention.

FIG. 5 illustrates a configuration of the transmitter 1.

As illustrated in FIG. 5, the transmitter 1 includes a series-parallel converting (SP converting) unit 11 for converting the inputted 10-Gbps series data to 6-bit parallel data; an encoding unit 12 for generating an information signal for a pulse number k to be outputted to a symbol and pulse generation timing based on the parallel data obtained through the SP conversion; a pulse number signal generating unit 13 for generating a pulse number signal based on the information signal generated by the encoding unit 12; a timing control signal generating unit 14 for generating a timing control signal based on the information signal generated by the encoding unit 12; a multiphase clock generating unit 15 for outputting multiphase clocks of eight phases different from each other by 360°×τ/T=45° in a frequency of 10 GHz; a selector 16 for selecting one of the multiphase clocks of eight phases for each slot by using the pulse number signal and the timing control signal; a short pulse generator 17 for generating short pulses having a half-width of 10 ps by using the clock signal selected by the selector 16; a bandpass filter 18 of an 80-90 GHz band for converting short pulses to an RF pulse signal; and a transmission amplifier 19 for amplifying the RF pulse signal. The amplified RF pulse signal is radiated to the air via an antenna.

Figure 6:
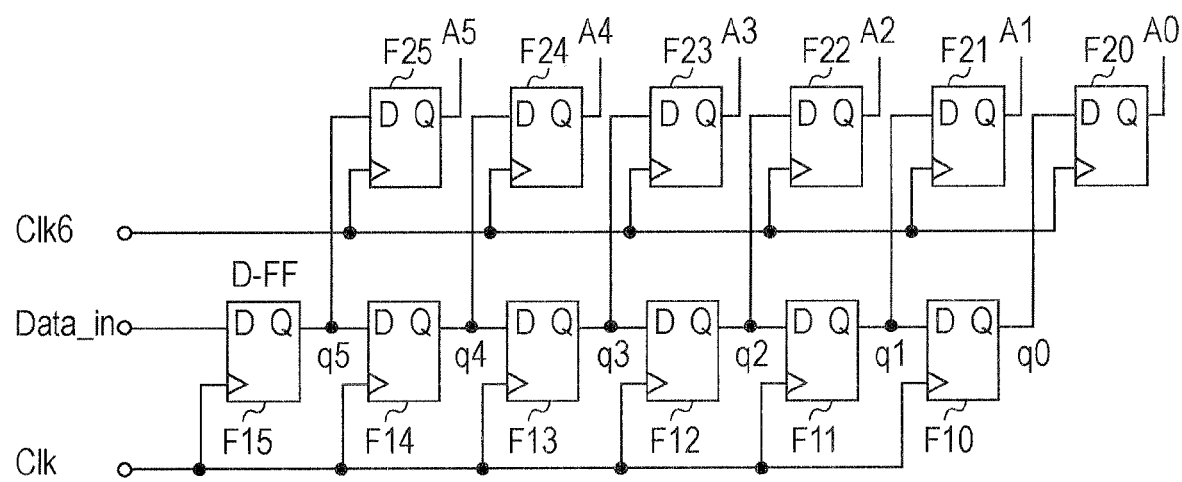
FIG. 6 illustrates a configuration of a series-parallel converting unit of the transmitter according to the present invention.
Figure 7:
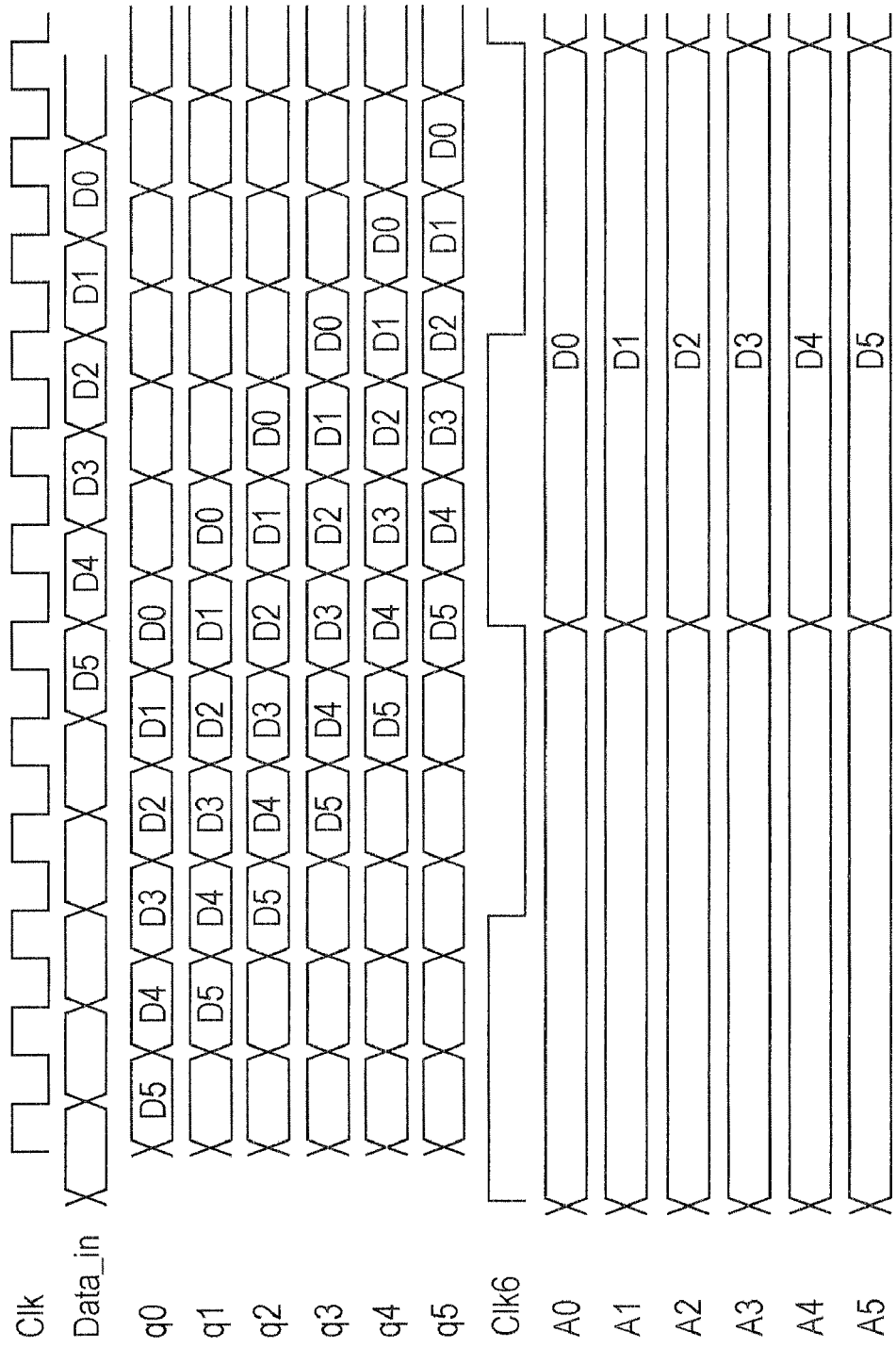
FIG. 7 is a timing chart illustrating an operation of the series-parallel converting unit of the transmitter according to the present invention.
Figure 9A:
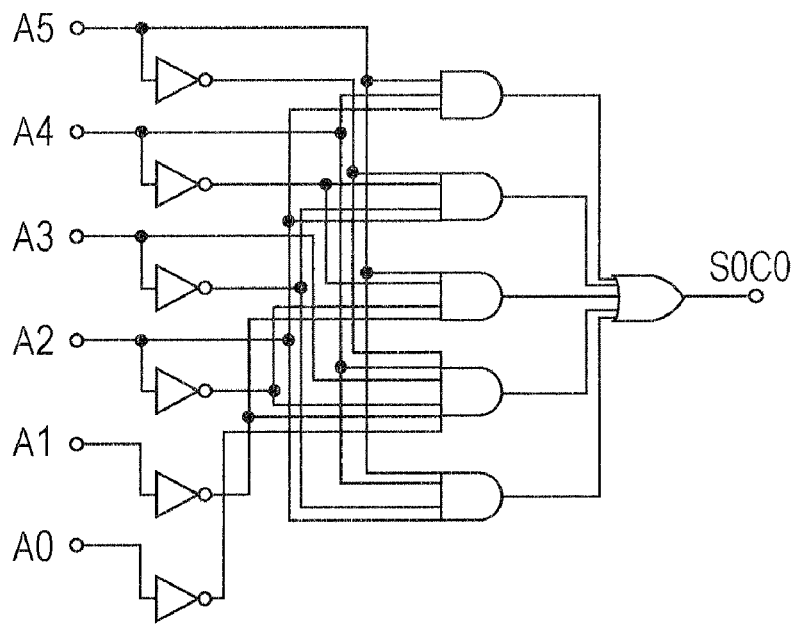
FIGS. 9A to 9J illustrate circuit configurations of the encoding unit according to the present invention.
Figure 9B:
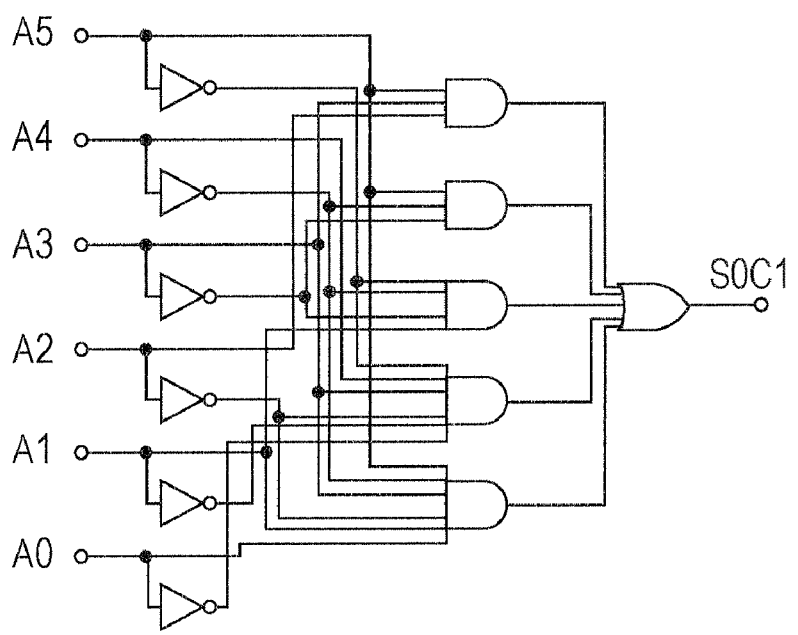
Figure 9C:
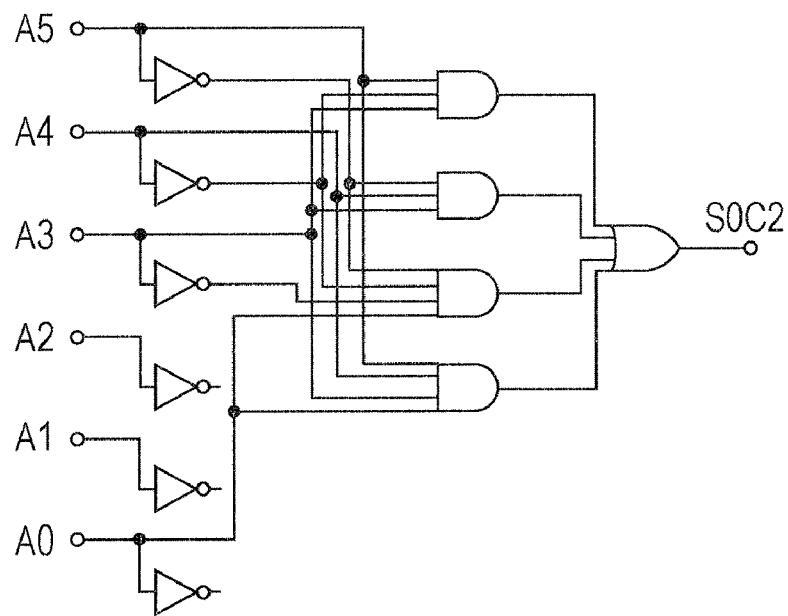
Figure 9D:
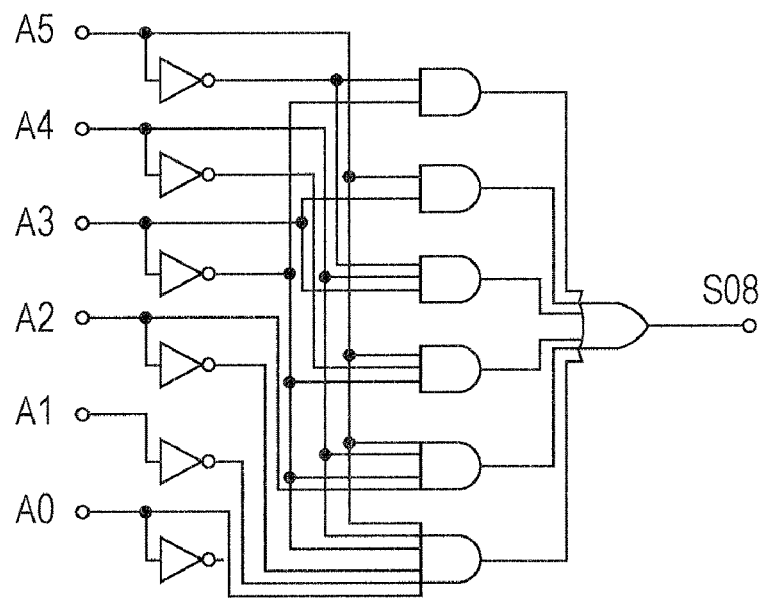
Figure 9E:
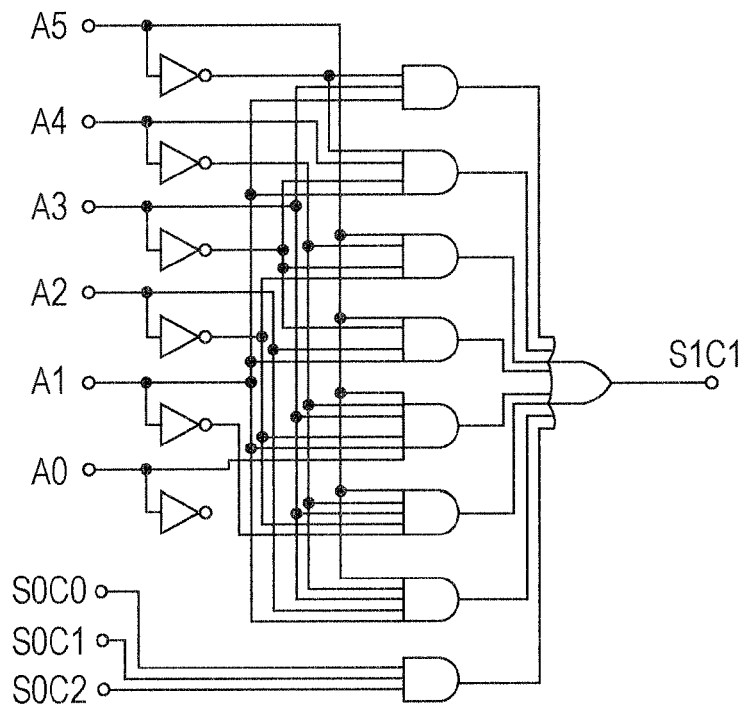
Figure 9F:
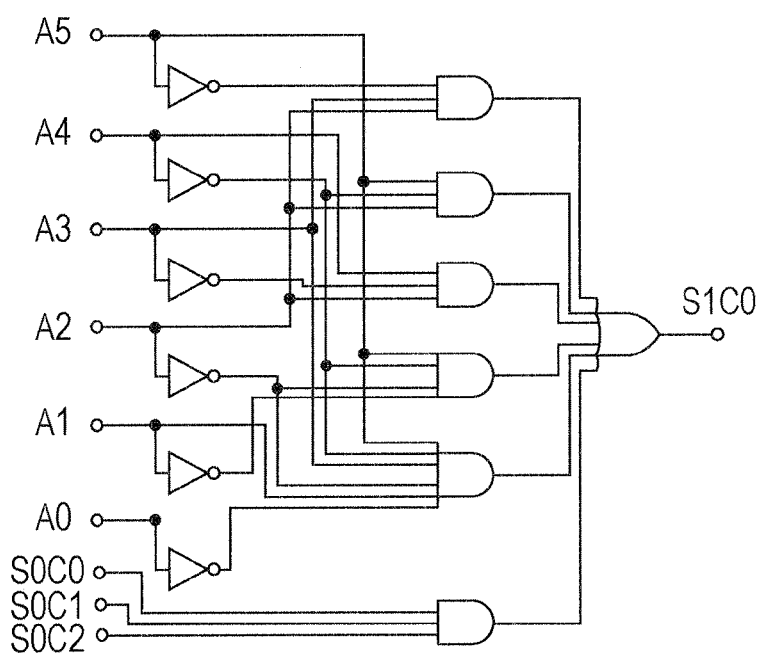
Figure 9G:
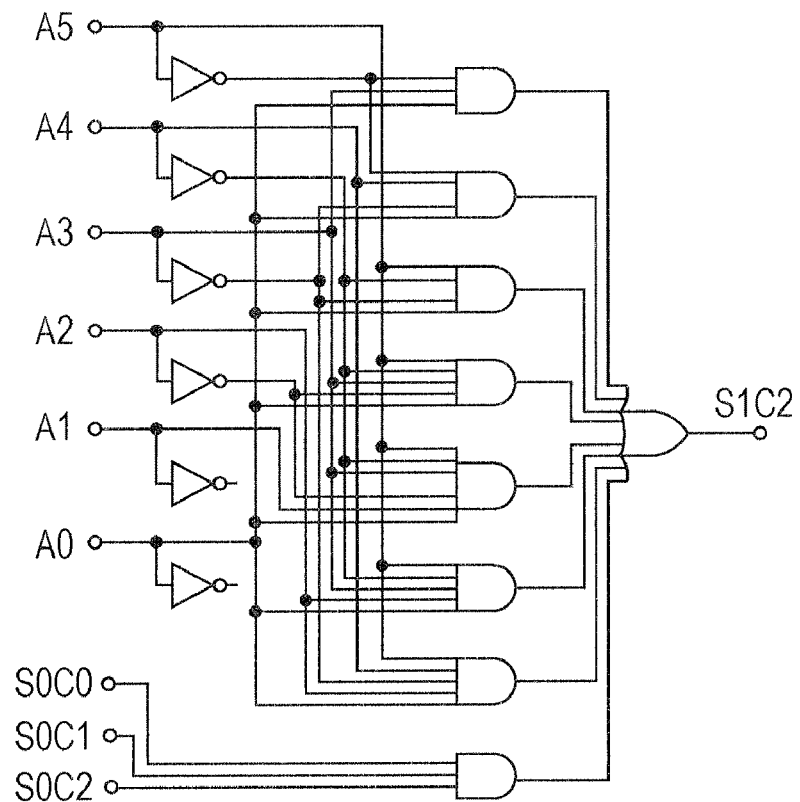
Figure 9H:
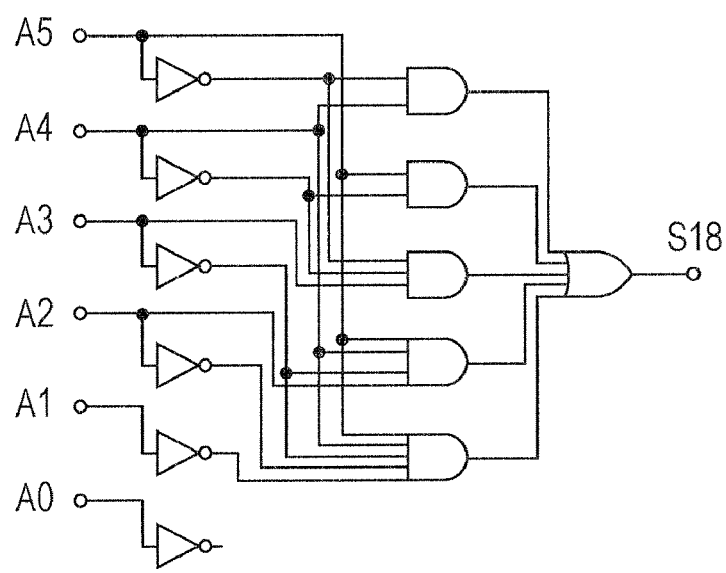
Figure 9I:
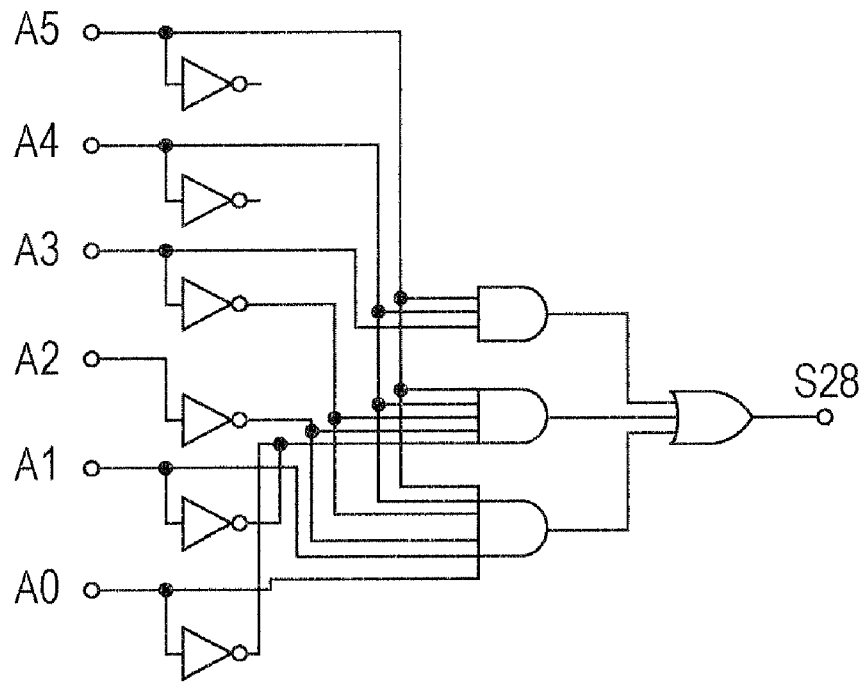
Figure 9J:
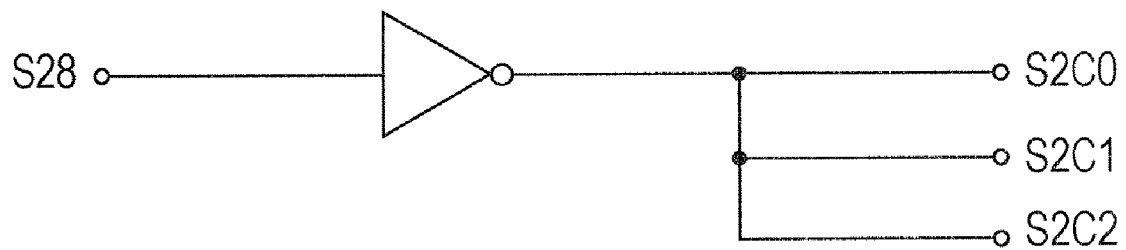
Figure 10A:
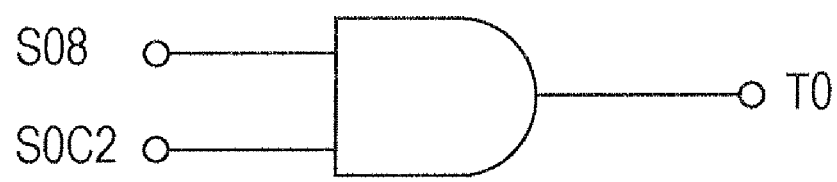
FIGS. 10A to 10E illustrate circuit configurations of a pulse number signal generating unit according to the present invention.
Figure 10B:
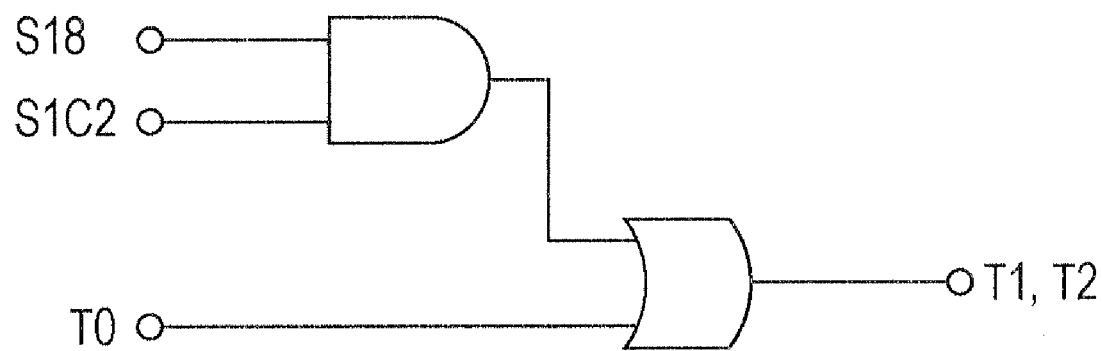
Figure 10C:
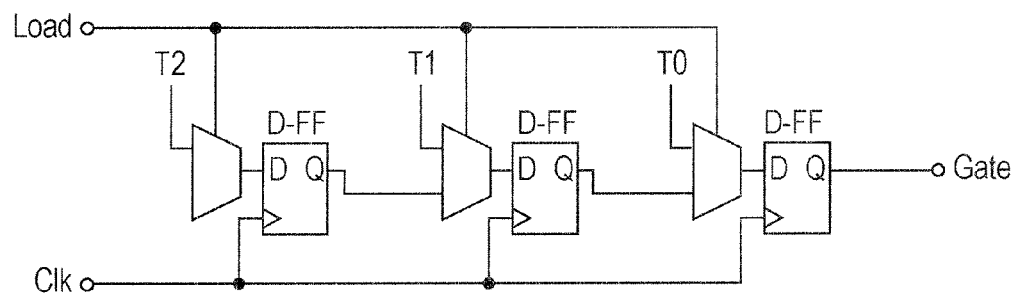
Figure 10D:
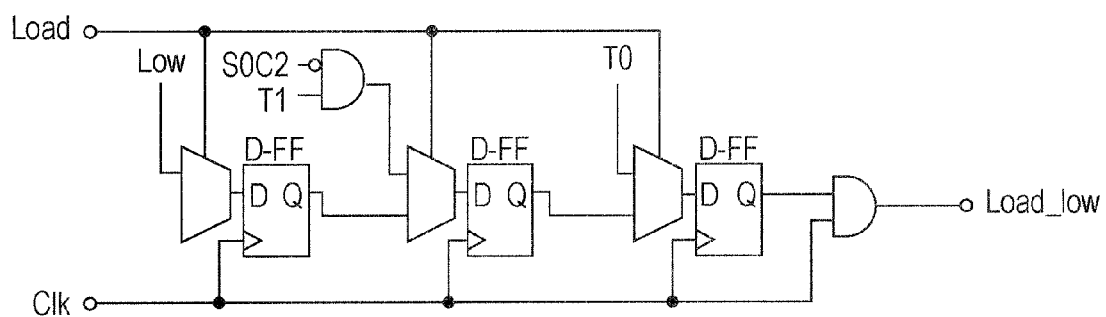
Figure 10E:
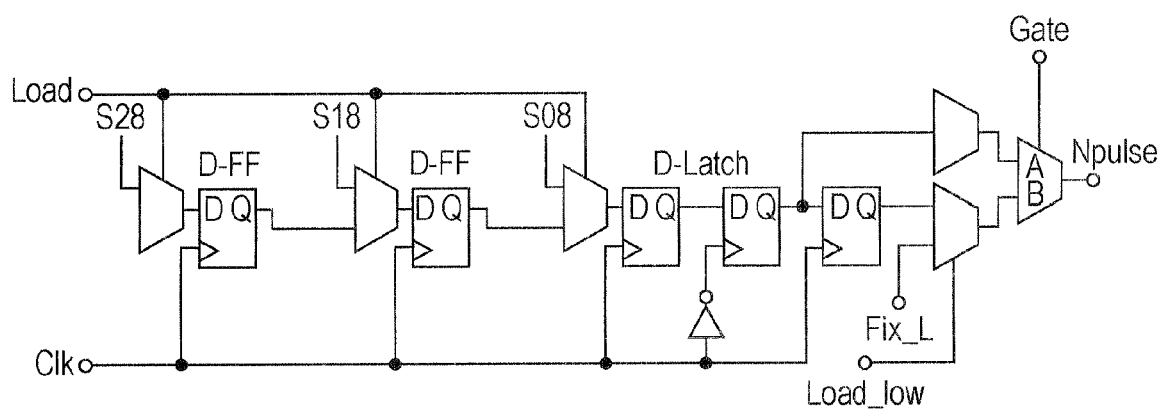

FIG. 6 illustrates a circuit configuration of the SP converting unit 11, and FIG. 7 is a timing chart illustrating a circuit operation of the SP converting unit 11. As illustrated in FIG. 6, the SP converting unit 11 includes a set of six flip-flops F10 to F15 constituting a shift register and a set of six flip-flops F20 to F25 constituting a latch. Clk6 is generated by performing 1/6 frequency division on clock Clk. The SP converting unit 11 converts six pieces of 1-bit series input data D0 to D5 to 6-bit parallel data. The values of respective bits of the output 6-bit parallel data are A0 to A5. Such a circuit configuration and operation are widely known, and thus, the description thereof is omitted.

Figure 8A:
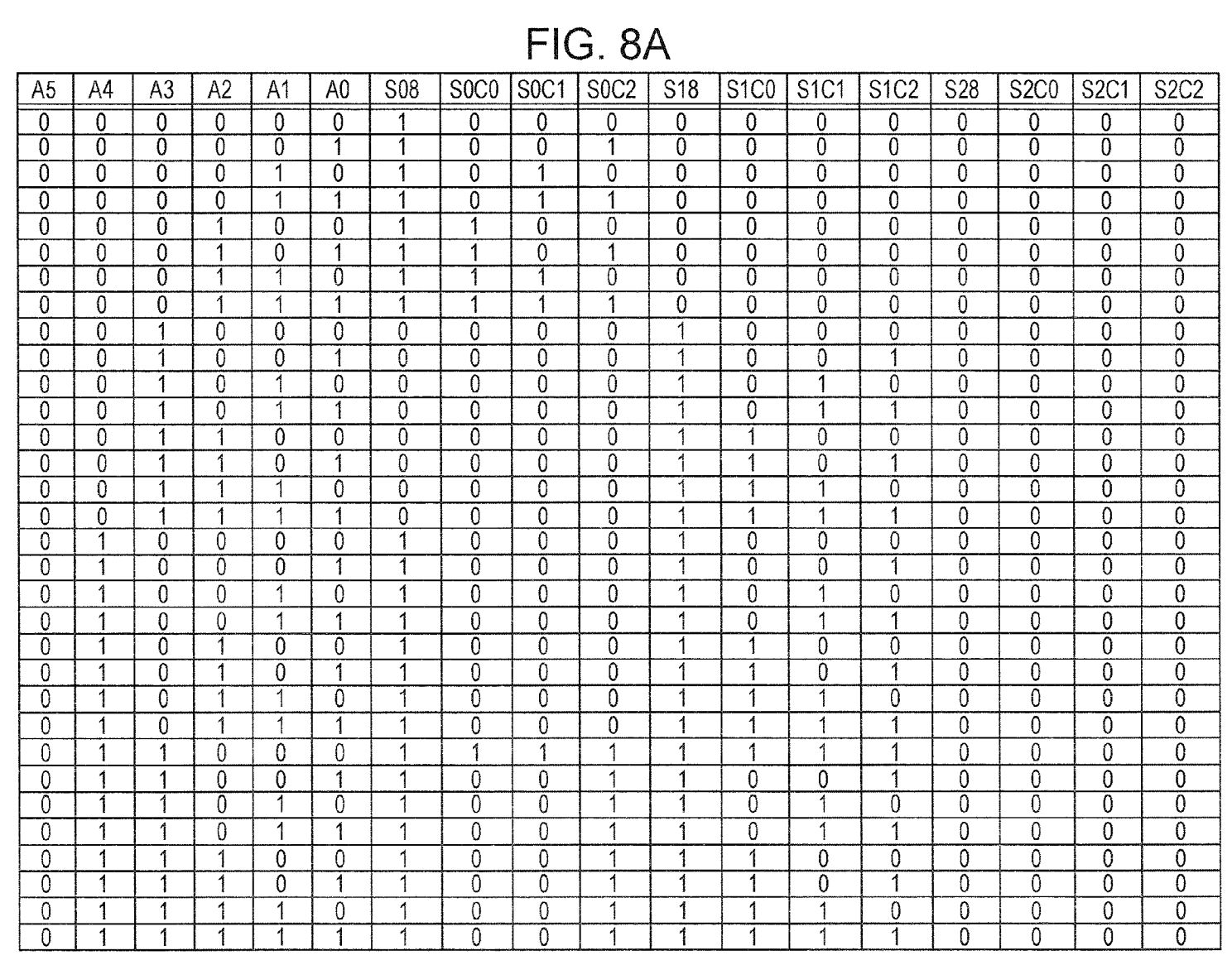
Figure 8B:
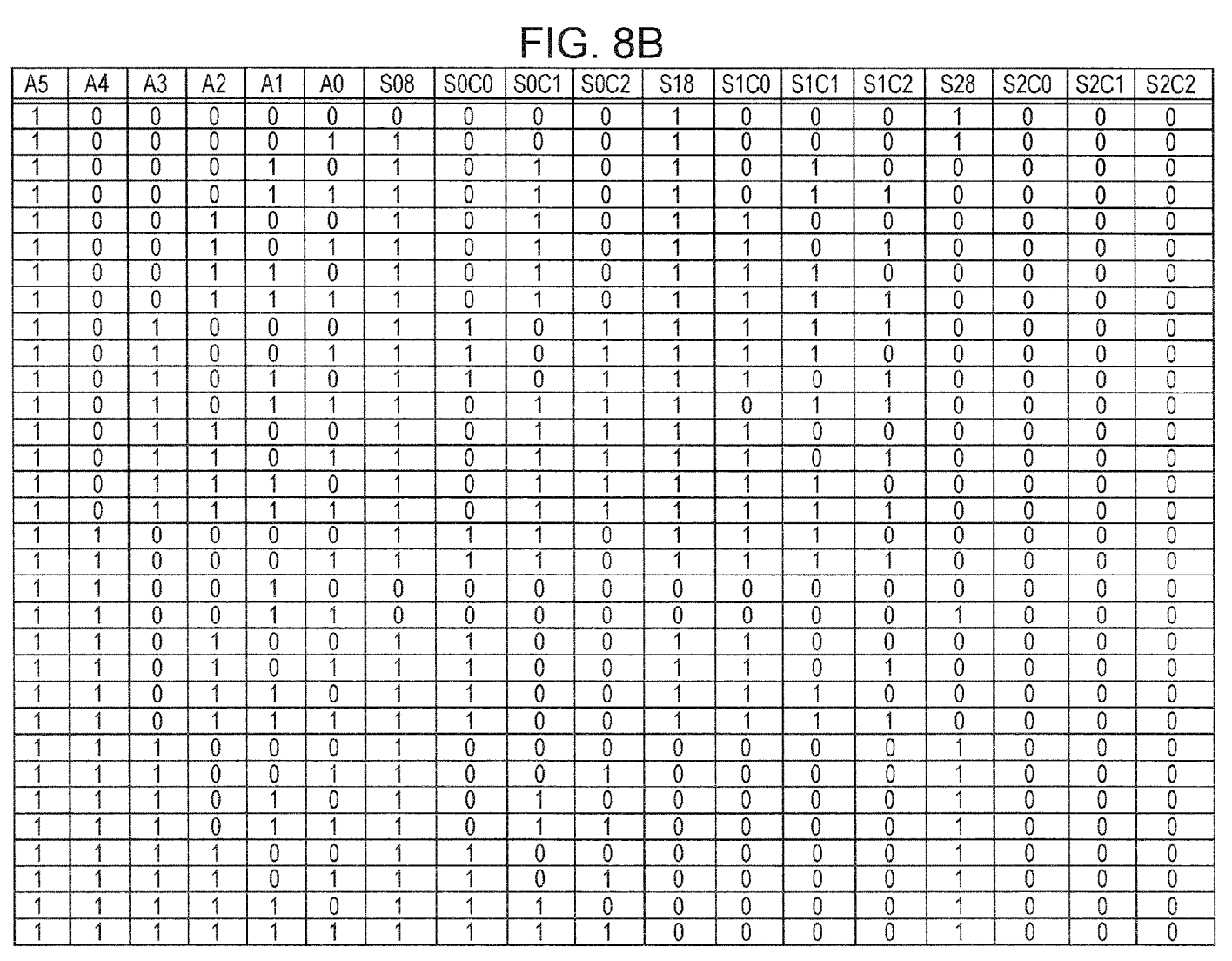

FIGS. 8A and 8B are truth value tables used for an encoding process performed by the encoding unit 12 to generate pulse position information and pulse existence information based on the parallel data A0 to A5. FIG. 8A illustrates the part of the most significant bit A5=0 of the parallel data, and FIG. 8B illustrates the part of A5=1. S0C0 to S0C2 indicate pulse position information in the zeroth slot and specify one of eight sub-slots in the zeroth slot. S08 indicates the pulse existence information of the zeroth slot. When S08 is "H", a pulse of which the head is in the zeroth slot is generated. When S08 is "L", a pulse of which the head is in the zeroth slot is not generated. Likewise, S1C0 to S1C2 indicate pulse position information in the first slot and specify one of eight sub-slots in the first slot. S18 indicates the pulse existence information of the first slot. When S18 is "H", a pulse of which the head is in the first slot is generated. When S18 is "L", a pulse of which the head is in the first slot is not generated. S2C0 to S2C2 indicate pulse position information in the second slot and specify one of sub-slots in the second slot. S28 indicates the pulse existence information of the second slot. When S28 is "H", a pulse of which the head is in the second slot is generated. When S28 is "L", a pulse of which the head is in the second slot is not generated.

FIGS. 9A to 9J illustrate circuit configurations to generate S0C0, S0C1, S0C2, S08, S1C0, S1C1, S1C2, S18, S28, S2C0, S2C1, and S2C2 from the parallel data A0 to A5 based on the truth value tables illustrated in FIGS. 8A and 8B. These circuits are gate circuits and can be easily understood by those skilled in the art, and thus the description about the operation thereof is omitted.

FIGS. 10A to 10E illustrate circuits constituting the pulse number signal generating unit 13. The operation of these circuits can be easily understood by those skilled in the art, and thus the description is omitted.

Figures 11, 12:
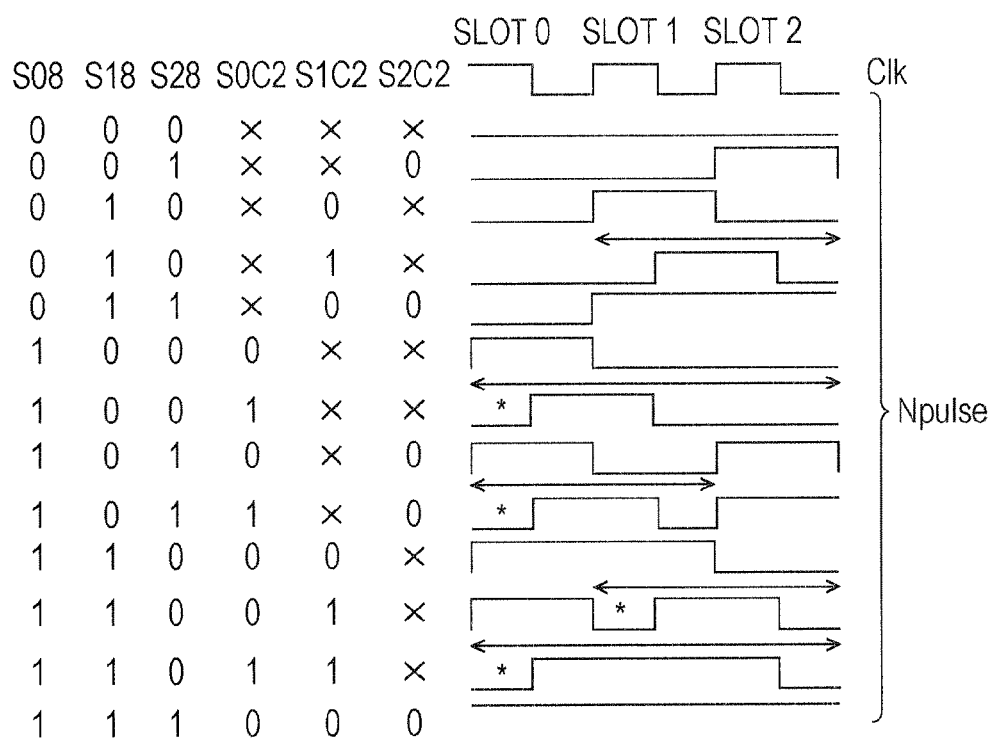
FIG. 11 illustrates a truth value table used for a process performed by the pulse number signal generating unit according to the present invention.
FIG. 12 is a timing chart illustrating an operation of the pulse number signal generating unit according to the present invention.

FIG. 11 is a truth value table of T0, T1, T2, and Load_low generated from the pulse existence information S08, S18, and S28 and the pulse position information S0C2, S1C2, and S2C2 in the pulse number signal generating unit 13.

T0 to T2 signals are generated based on the truth value table in FIG. 11. A Gate signal generated in the pulse number signal generating unit 13 is a control signal for shifting the pulse generation timing by a half-slot when a pulse-generating sub-slot is positioned at the latter half of a slot. In the zeroth slot, the pulse generation timing is shifted by a half-slot when the T0 signal is "H" and is not shifted when the T0 signal is "L". Likewise, in the first slot, the pulse generation timing is shifted by a half-slot when the T1 signal is "H" and is not shifted when the T1 signal is "L". In the second slot, the pulse generation timing is shifted by a half-slot when the T2 signal is "H" and is not shifted when the T2 signal is "L". The Gate signal is supplied also to the timing control signal generating unit 14. The Load_low signal is used to intentionally insert a non-passing signal so that a pulse signal is not output at undesired time.

The pulse number signal generating unit 13 generates a window signal Npulse based on the Gate signal, the Load_low signal, and the S08 to S28 signals.

FIG. 12 is a timing chart of the window signal Npulse with respect to the pulse existence information S08, S18, and S28 and the pulse position information S0C2, S1C2, and S2C2. The parts indicated by arrows correspond to the period to select "B" in the selector in the last stage illustrated in FIG. 10E. In the other parts, "A" is selected. On the other hand, * indicates that Fix_L is selected in the selector in the second last stage illustrated in FIG. 10E.

Figure 13:
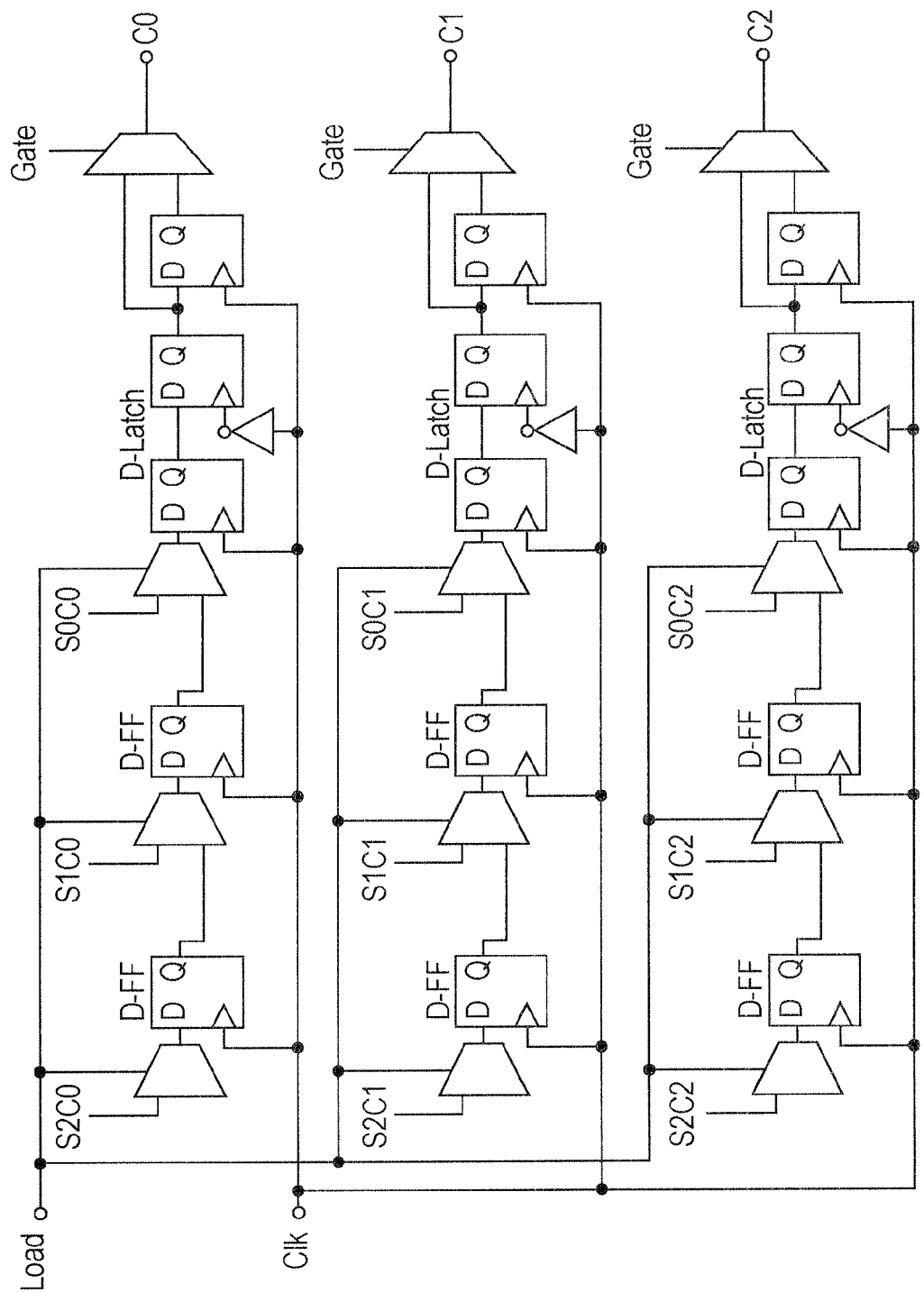
FIG. 13 illustrates a circuit configuration of a timing control signal generating unit according to the present invention.

FIG. 13 illustrates a circuit configuration of the timing control signal generating unit 14. The timing control signal generating unit 14 generates timing control signals C0 to C2 for determining the pulse generation timings in the zeroth to second slots based on the pulse position information S0C0, S0C1, S0C2, S1C0, S1C1, S1C2, S2C0, S2C1, and S2C2. The Gate signal changes the generation time of the timing control signals by a half-slot. The operation of this circuit can be easily understood by those skilled in the art, and thus the description is omitted.

Figure 14:
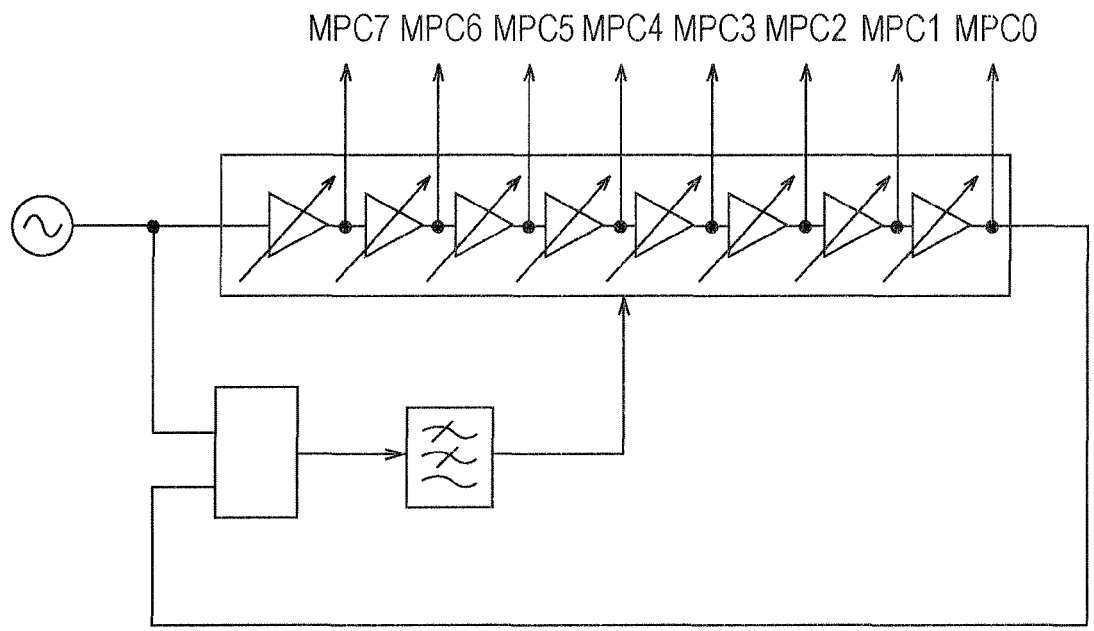
FIG. 14 illustrates a circuit configuration of a multiphase clock generating unit according to the present invention.

FIG. 14 illustrates a circuit configuration of the multiphase clock generating unit 15 for outputting multiphase clocks of eight phases. As illustrated, the multiphase clock generating unit 15 is a delay lock loop (DLL) circuit including a variable delay circuit having eight stages of variable delay inverters connected in series, a low-pass filter, a phase comparator, and a reference oscillator. This circuit is widely known and thus the description is omitted.

Figure 15:
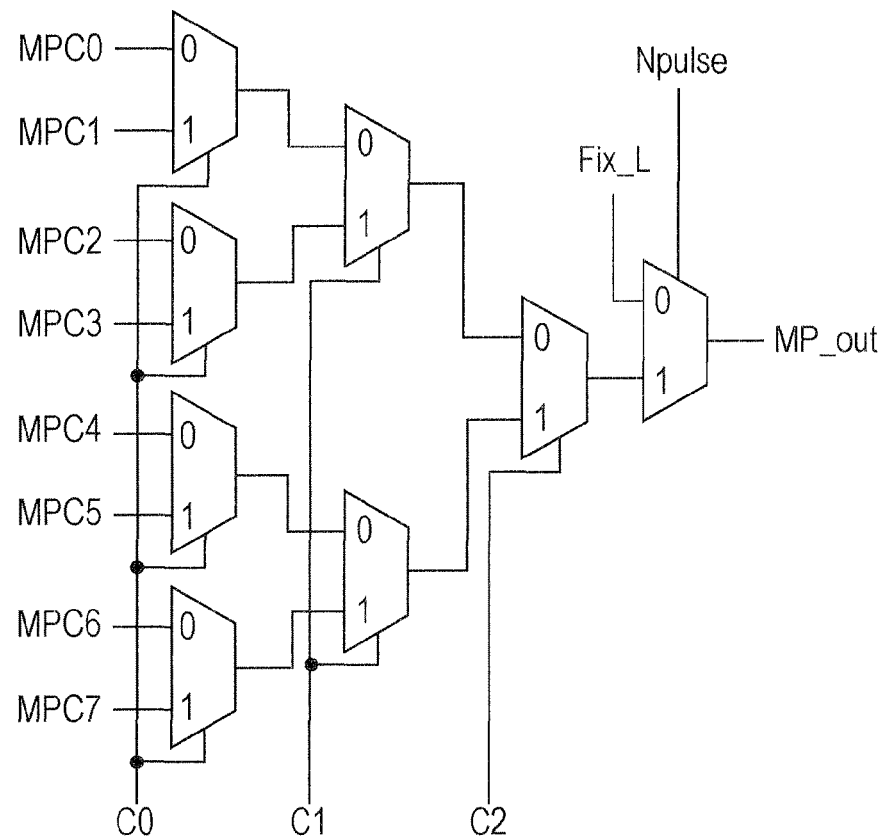
FIG. 15 illustrates a circuit configuration of a selector according to the present invention.

FIG. 15 illustrates a circuit configuration of the selector 16 for selecting any of the multiphase clocks of eight phases based on the timing control signals C0 to C2. A selector to turn ON/OFF the output in accordance with Npulse is further provided in the last stage. The description about the operation of this circuit is also omitted.

Figure 16A:
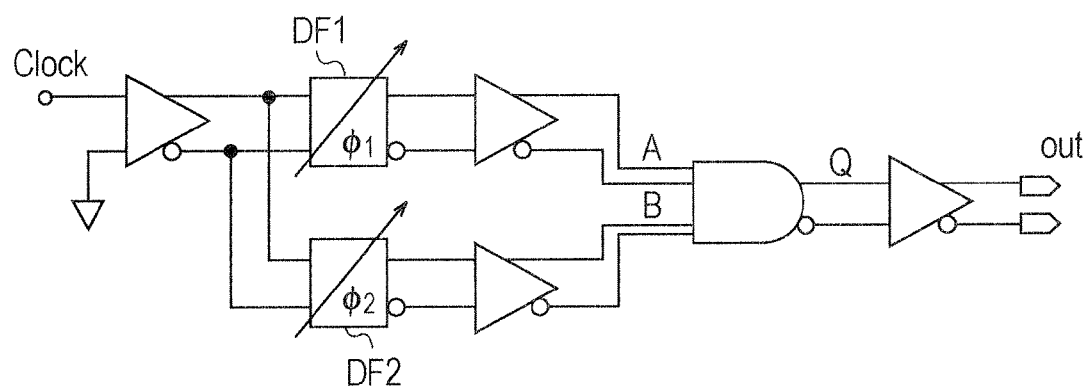
FIG. 16A illustrates a circuit configuration of a short pulse generating unit according to the present invention and FIG. 16B is a time chart illustrating an operation of the short pulse generating unit according to the present invention.
Figure 16B:
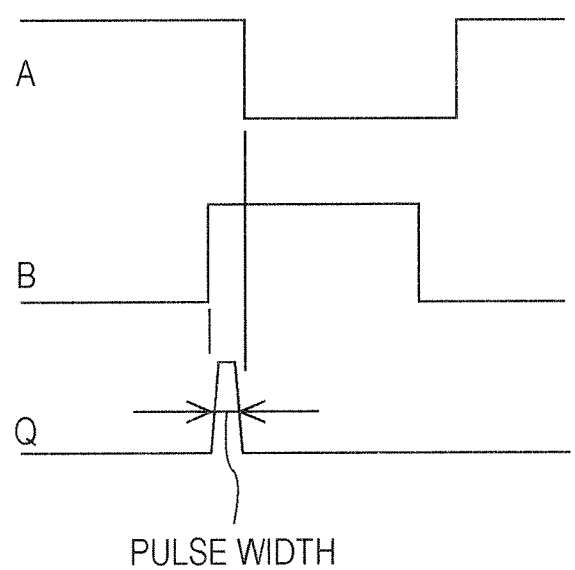

FIG. 16A illustrates a circuit configuration of the short pulse generator 17. As illustrated, the short pulse generator 17 is a pulse generating circuit including an AND gate circuit. As illustrated in the timing chart in FIG. 16B, the delay amount of input signals in two series of the AND gate circuit is adjusted by using delay control buffers DF1 and DF2, and short pulses are generated so that a slight overlap is generated.

Figure 17:
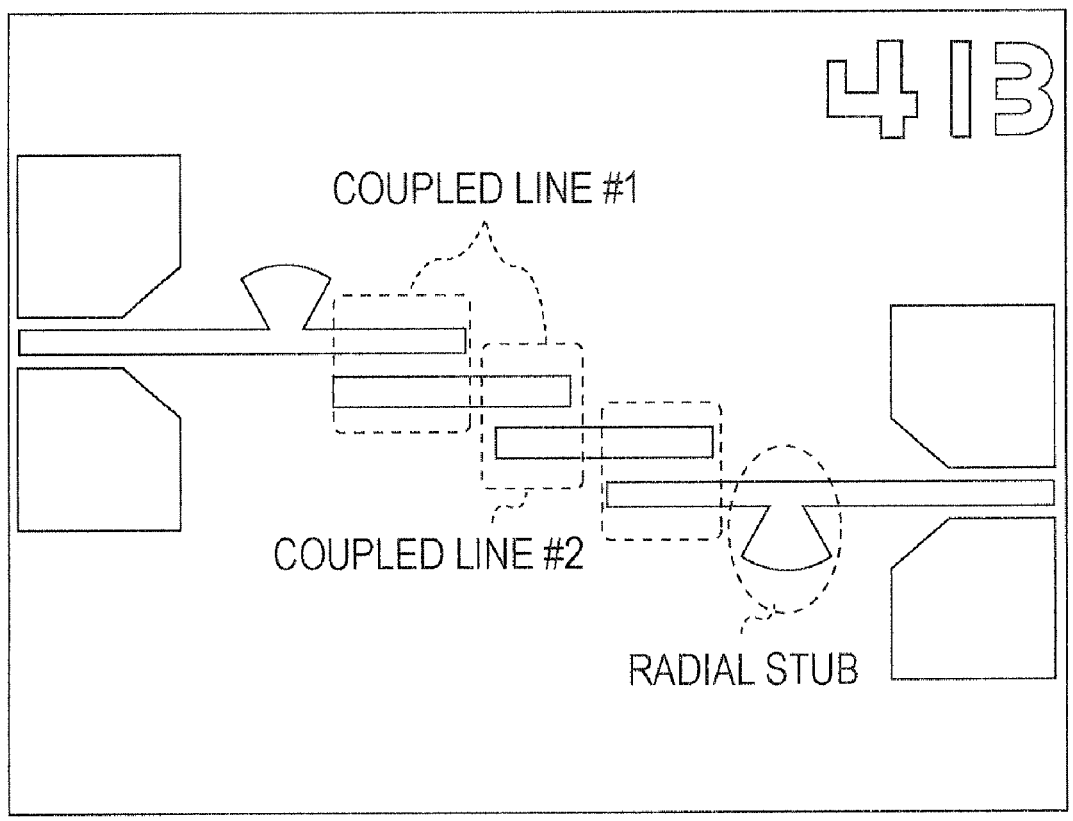
FIG. 17 illustrates a configuration of a bandpass filter according to the present invention.

FIG. 17 illustrates an example of a configuration of the bandpass filter 18 for converting short pulses to an RF pulse signal. The bandpass filter 18 includes four stages of coupled line filters dependently connected on a ceramic substrate and realizes a filter having a passband of 80 to 90 GHz.

Next, the receiver 2 is described.

Figure 18:
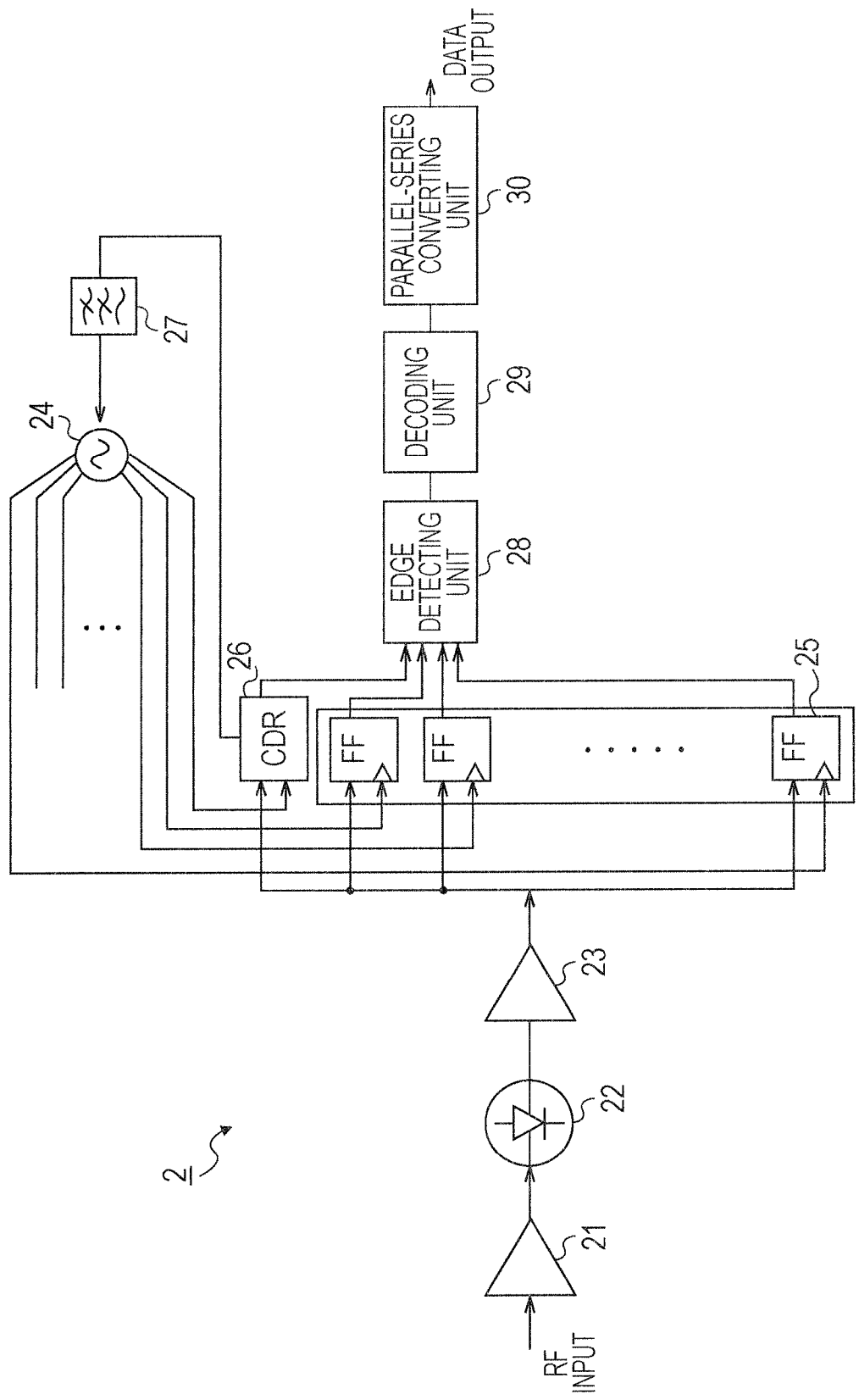
FIG. 18 illustrates a configuration of a receiver of the pulse transmission system according to the present invention.

FIG. 18 illustrates a configuration of the receiver 2. The receiver 2 includes a low-noise reception amplifier 21 to amplify an RF signal received by an antenna; a wave detector 22 to detect an RF signal and generate an envelope signal; a limit amplifier 23 to sufficiently amplify an output of the wave detector 22; a multiphase clock generating unit 24; a flip-flop array 25; a clock data reproducing circuit (CDR) 26; a low-pass filter 27, an edge detecting unit 28; a decoding unit 29; and a parallel-series converting unit 30.

The configurations of the reception amplifier 21, the wave detector 22, and the limit amplifier 23 are the same as those in a related art, and thus the description thereof is omitted.

The CDR 26 is a circuit to reproduce a clock based on a received RF signal. The CDR 26 establishes synchronization with a received RF signal with respect to at least one signal from the multiphase clock generating unit 24. During a period when synchronization is not established, a known signal sequence, e.g., 1010 . . . is continuously transmitted from the transmitter 1, and data communication is started after synchronization has been established.

An output of the wave detector 22 is inputted to the respective flip-flops in the flip-flop array 25 and the CDR 26 after the data transition becomes steeper due to the limit amplifier 23. The flip-flop array 25 includes seven flip-flops. By using eight flip-flops in total together with the flip-flop in the CDR 26, clocks of eight phases from the multiphase clock generating unit 24 are inputted to the respective flip-flops, and an RF signal is latched in each slot. When there is no RF signal in the slot, a latch result of all the flip-flops is "L". When there is an RF signal in the slot, a latch result of any of the flip-flops is "H".

Figure 19:
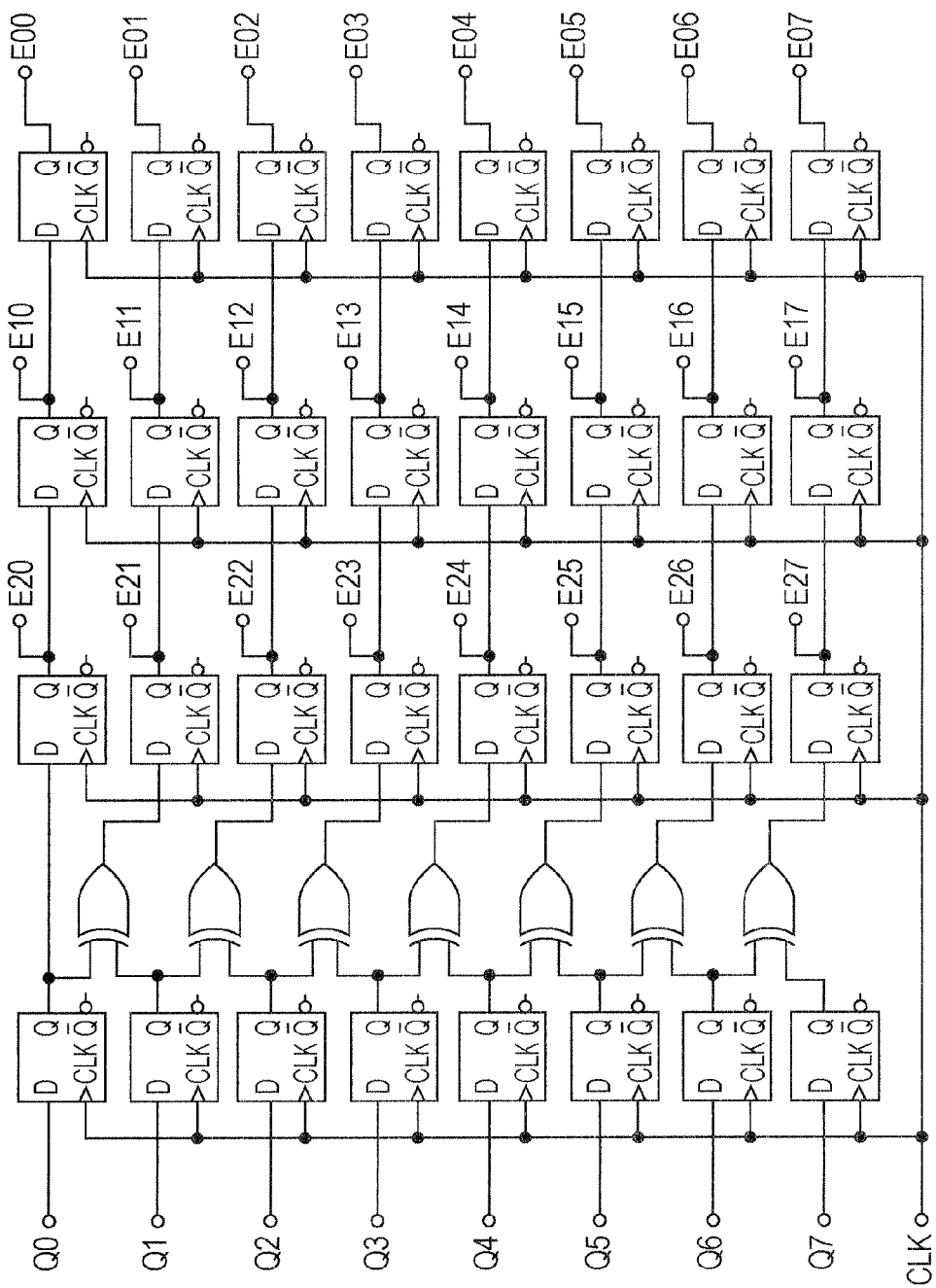
FIG. 19 illustrates a configuration of an edge detecting unit of the receiver according to the present invention.
Figure 21A:
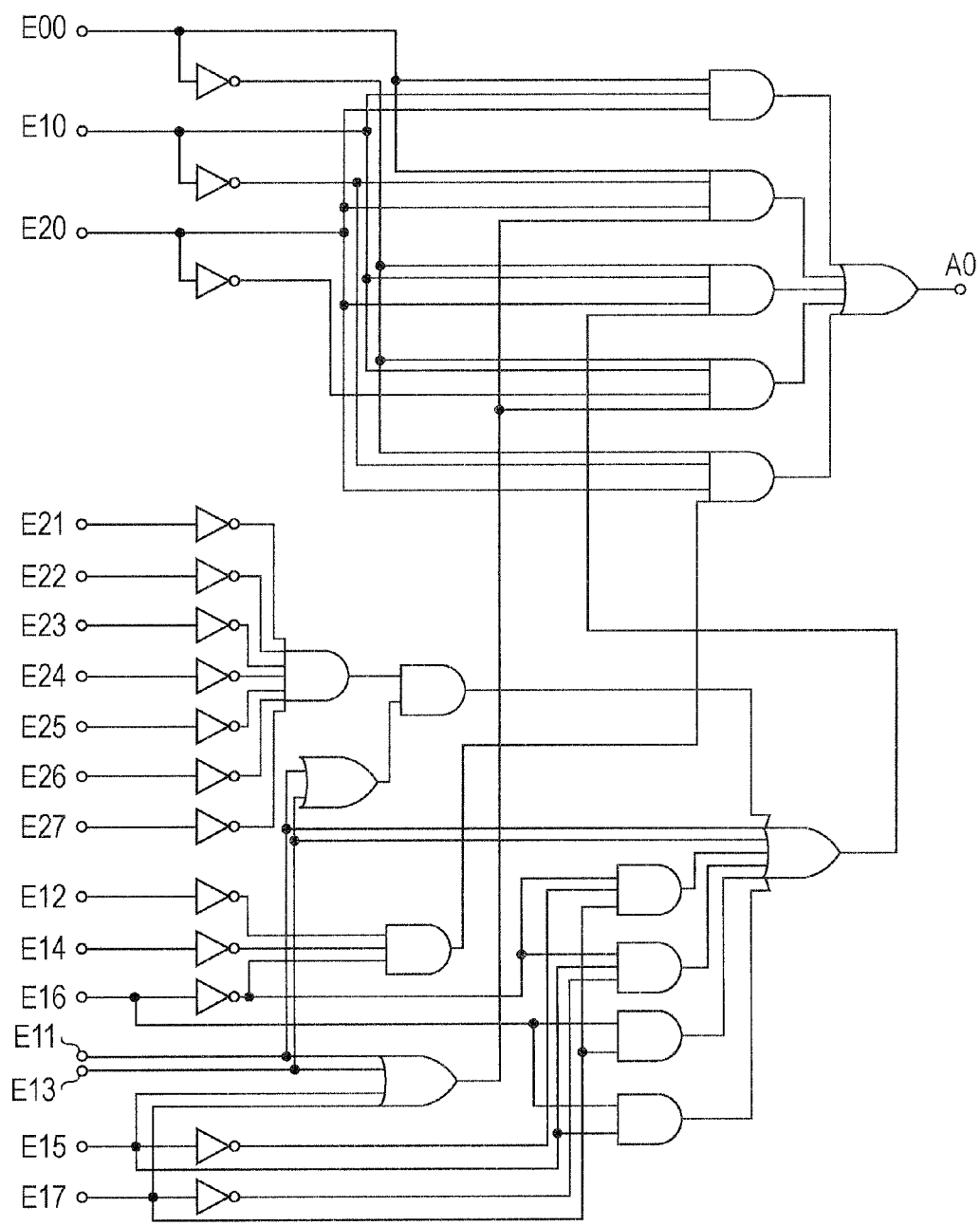
FIGS. 21A to 21F illustrate circuit configurations of the decoding unit according to the present invention.
Figure 21B:
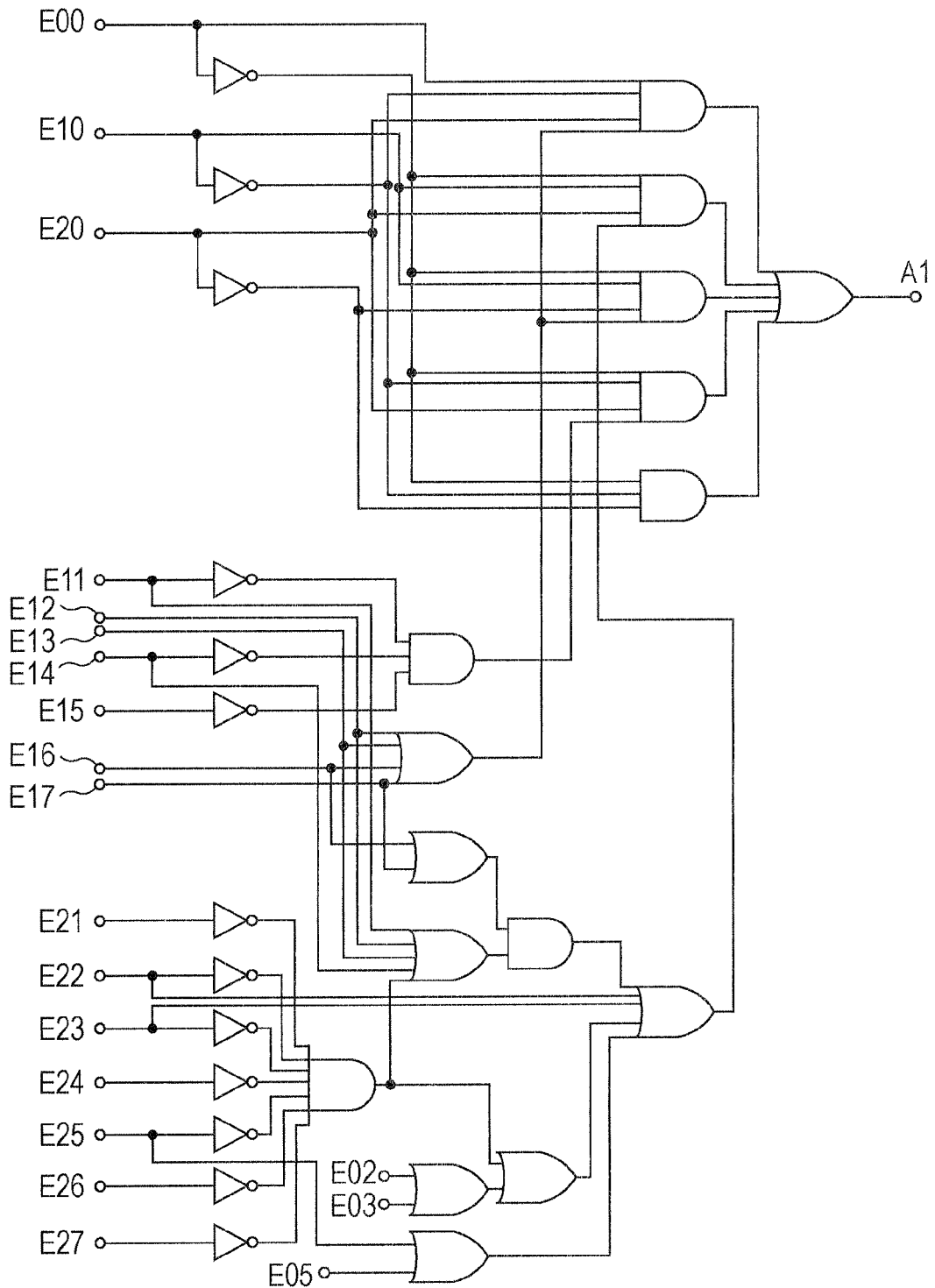
Figure 21C:
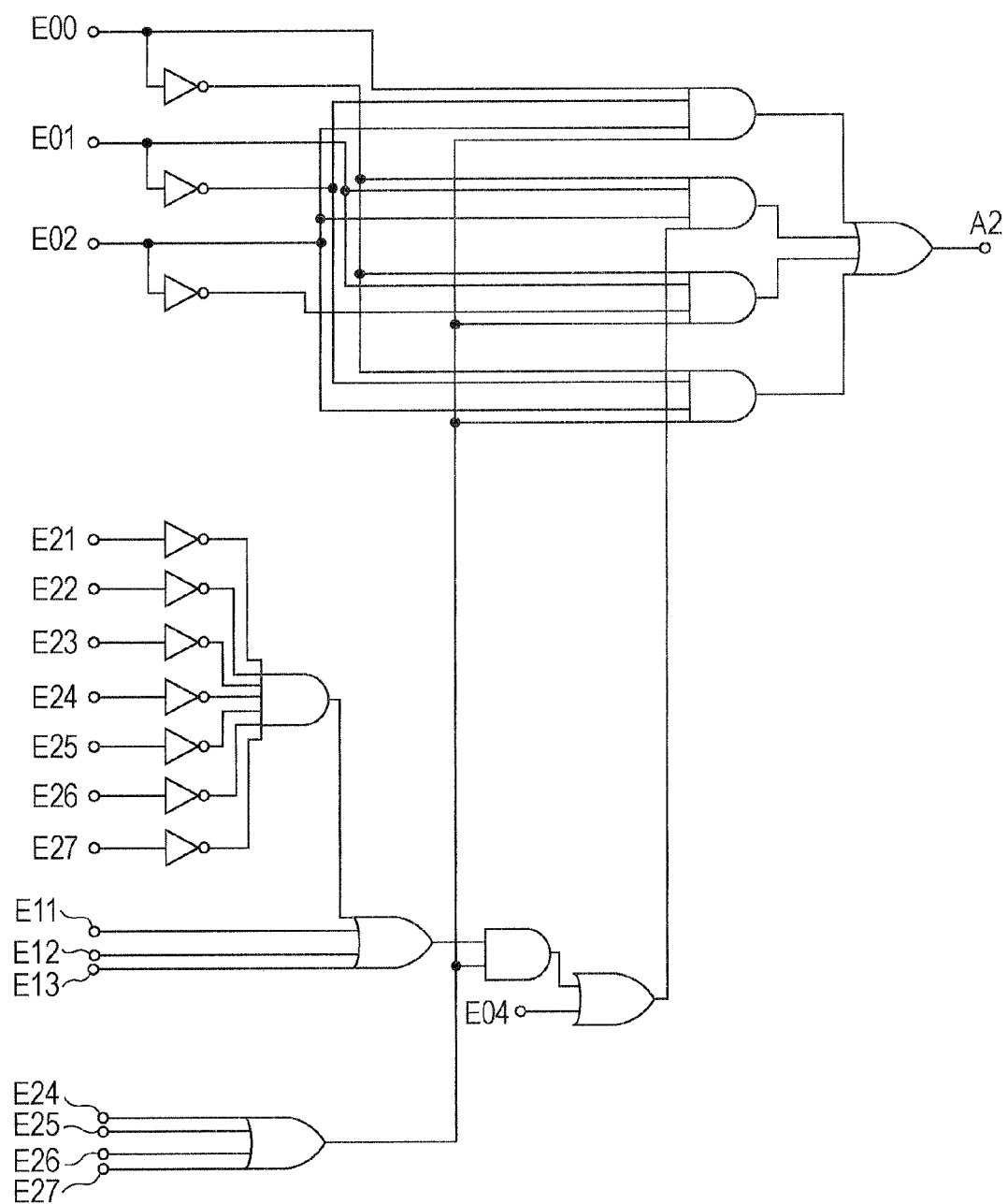
Figure 21D:
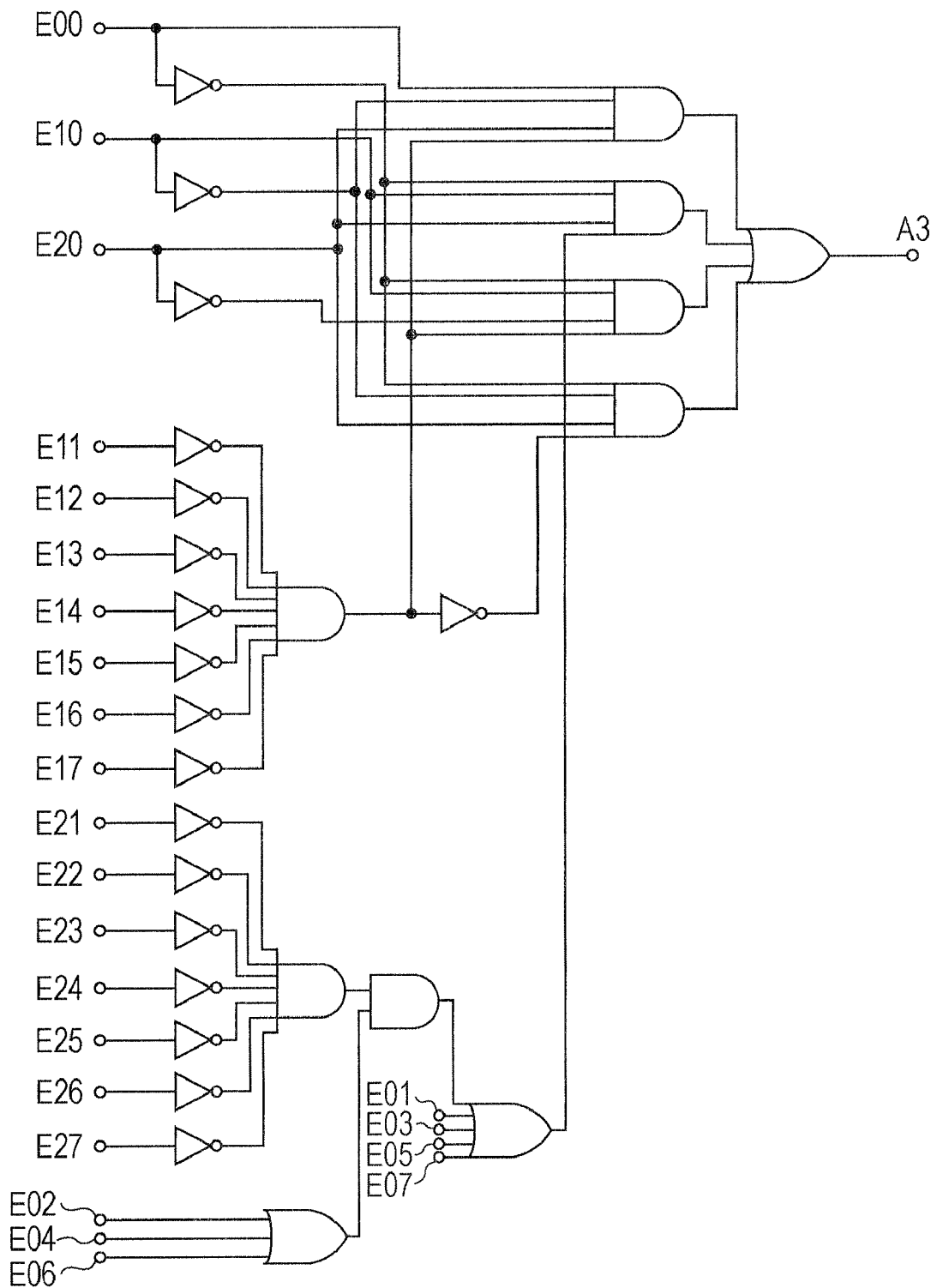
Figure 21E:
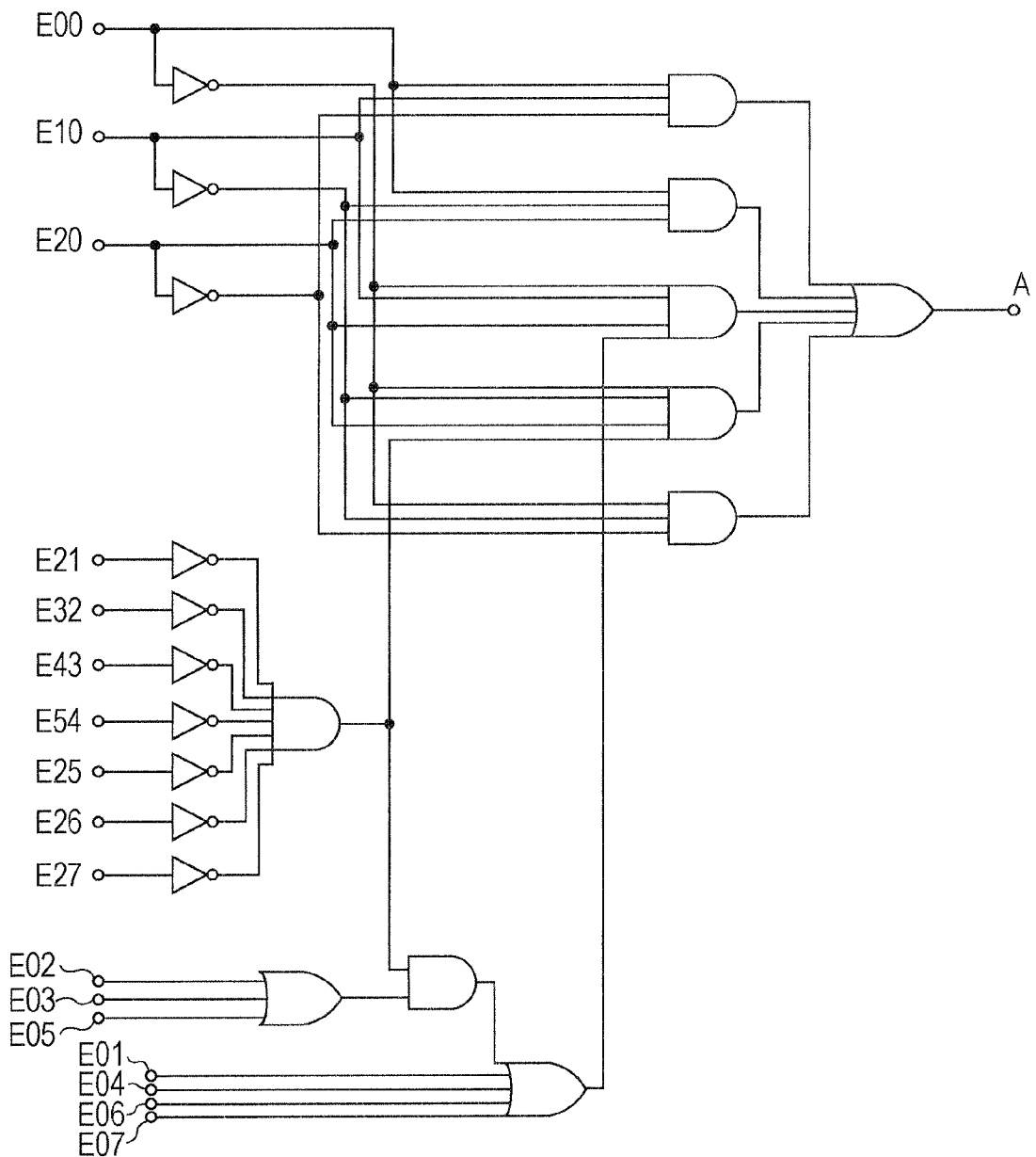
Figure 21F:
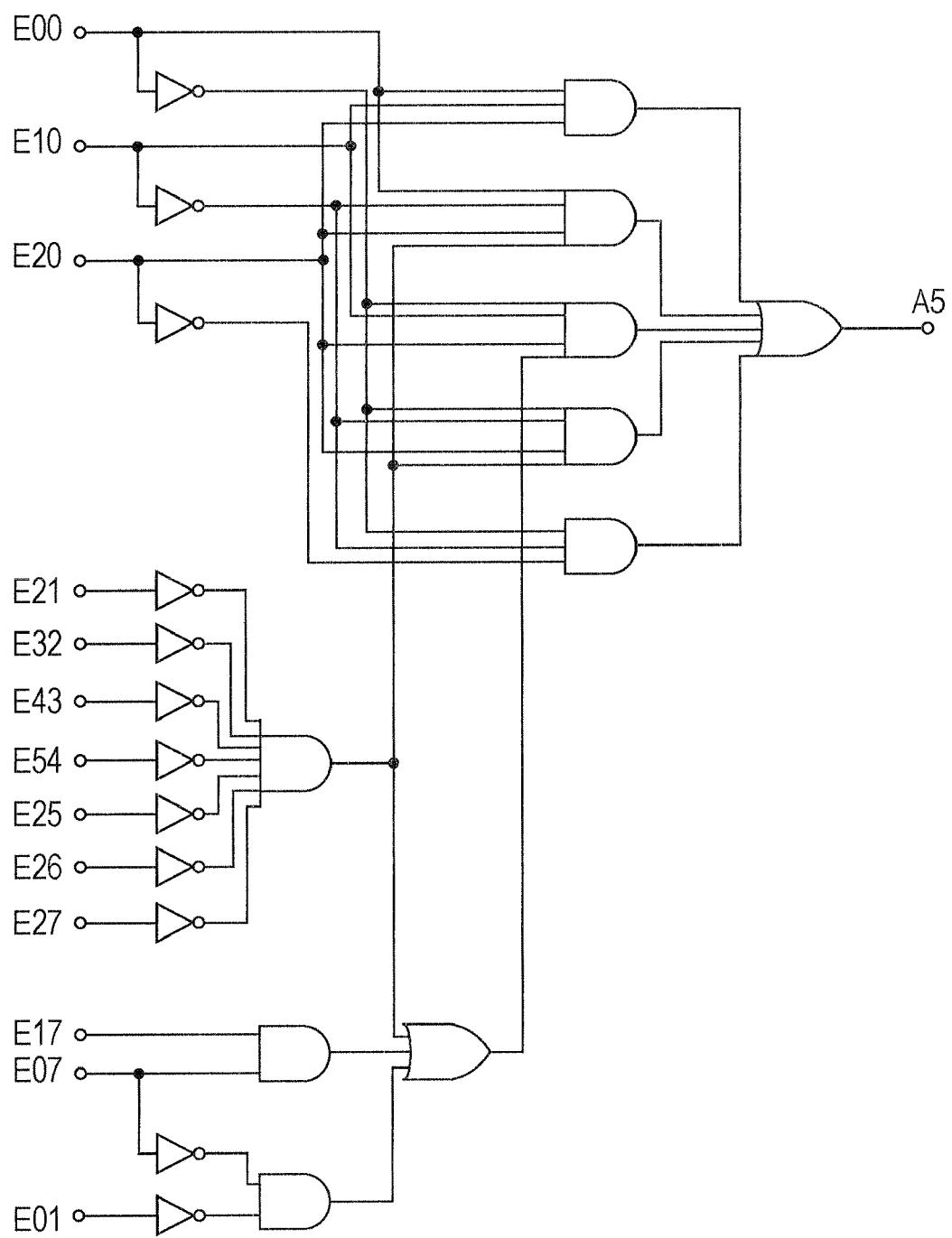

FIG. 19 illustrates a circuit configuration of the edge detecting unit 28. Outputs Q0 to Q7 of the eight flip-flops in the CDR 26 and the flip-flop array 25 are latched with a reference clock clk. Then, exclusive ORs (EXORs) of outputs of adjacent flip-flops are calculated. The EXOR output is "H" only in a data transition part and thus a data transition point is determined. The output of the seven EXORs and the output of the flip-flop in the first stage are accumulated as data E00-E07, E10-E17, and E20-E27 of three slots by a three-stage shift register.

Figure 20A:
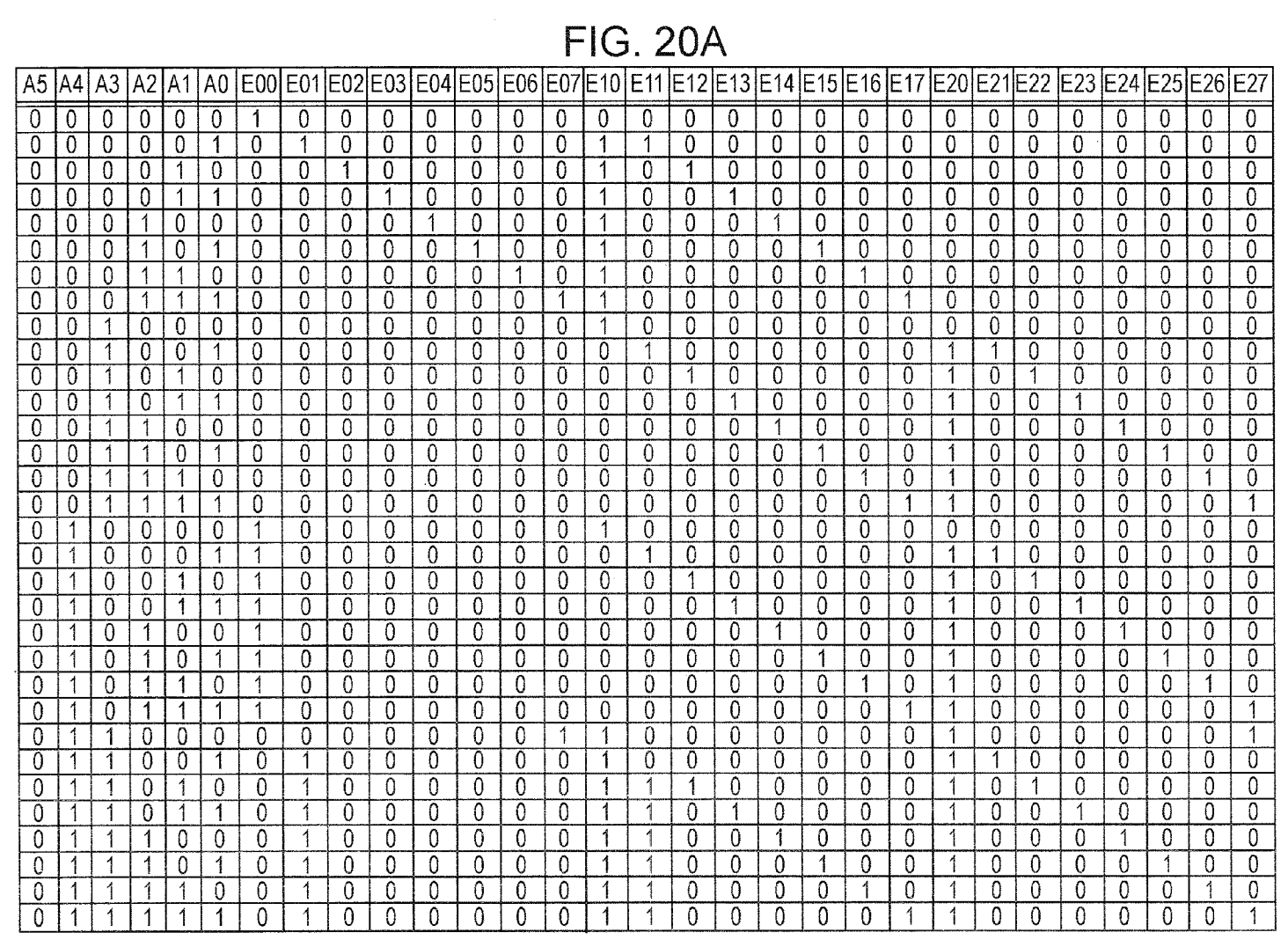
Figure 20B:
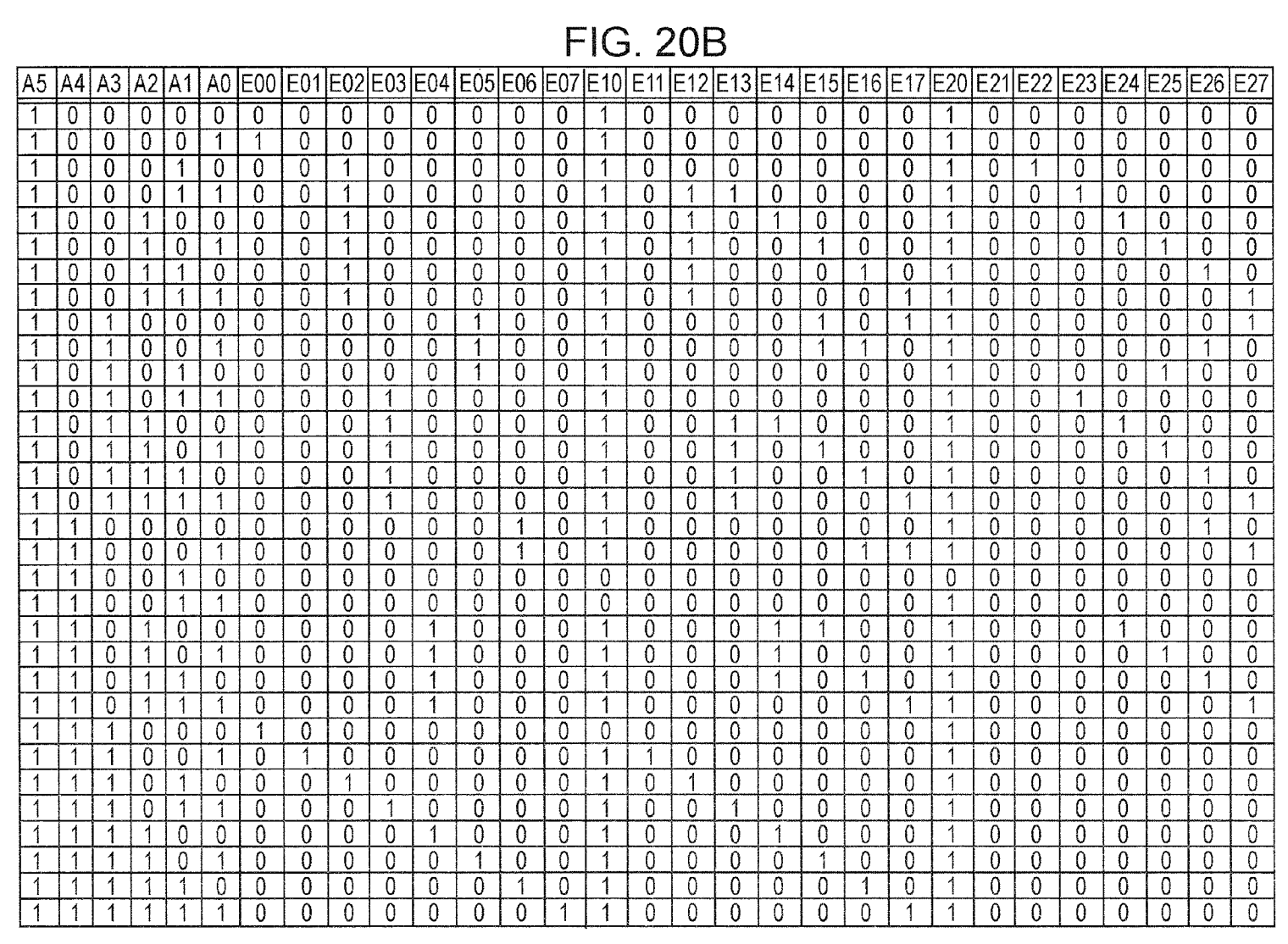

FIGS. 20A and 20B are truth value tables used for a decoding process performed by the decoding unit 29 to decode transmission data A0 to A5 based on the data E00-E07, E10-E17, and E20-E27 of three slots. FIG. 20A illustrates the part of the most significant bit A5=0 of the transmission data, and FIG. 20B illustrates the part of A5=1.

FIGS. 21A to 21F illustrate circuit configurations of decoding circuits to decode the transmission data A0 to A5. The operation of these circuits can be easily understood by those skilled in the art, and thus the description is omitted.

Figure 22:
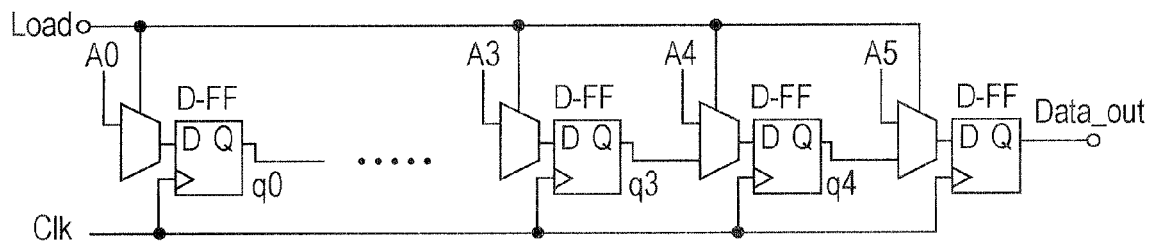
FIG. 22 illustrates a circuit configuration of a parallel-series converting unit according to the present invention.
Figure 23:
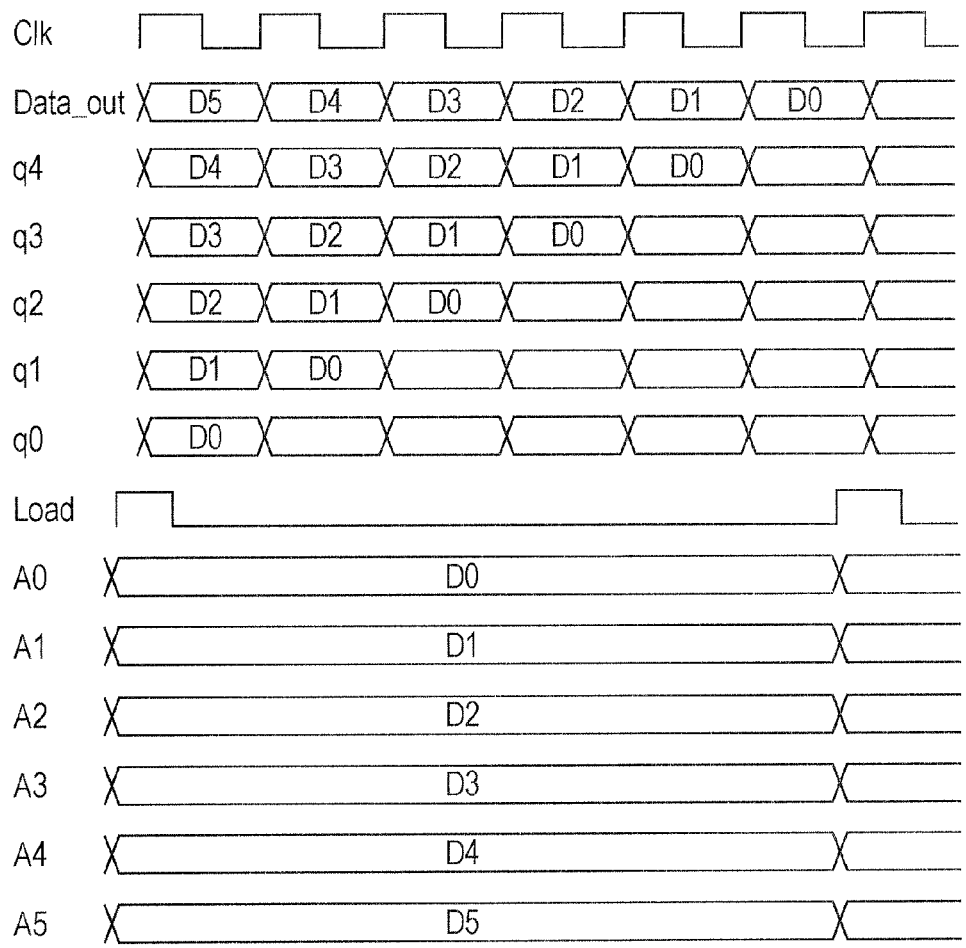
FIG. 23 is a time chart illustrating an operation of the parallel-series converting unit according to the present invention.

FIG. 22 illustrates a circuit configuration of the parallel-series converting unit 30 to convert 6-bit parallel data A0 to A5 outputted from the decoding unit 29 to series data. FIG. 23 is a timing chart illustrating the operation of the parallel-series converting unit 30. The operation of the circuit can be easily understood by those skilled in the art, and thus the description is omitted.

The embodiment of the present invention has been described above, but it is needless to say that various modifications other than the above-described embodiment can be applied. For example, each of the presented circuits is an example, and the same function can be realized by another circuit. Also, it is needles to say that an optimum form varies depending on the characteristic of transmitted data or the characteristic of a transmission line.

What is claimed is:

1. A pulse transmission method for transmitting data by using pulse signals, each having a predetermined pulse width, the pulse transmission method comprising:

defining a symbol time of at least N times the predetermined pulse width, wherein N is at least 2;

defining a basic delay time calculated by dividing the predetermined pulse width by a predetermined integer, wherein the predetermined integer is at least 2;

placing the pulse signals in the symbol time by delaying the pulse signals by an integral multiple of the basic delay time from the start of symbol time, the overall number of the pulse signals in the symbol time being k and $0 \leq k \leq N$ being satisfied; and transmitting the pulse signals.

2. The pulse transmission method according to claim 1, wherein the pulse signals represent a multilevel code by a combination of the placing.

3. The pulse transmission method according to claim 1, wherein the pulse signals are transmitted as radio signals.

4. A pulse transmission system to transmit data by using pulse signals, each having a predetermined pulse width, comprising:

a transmitter outputting a transmission signal; and a receiver receiving the transmission signal;

wherein the transmitter includes:

a first defining portion defining a symbol time of at least N times the predetermined pulse width, wherein N is at least 2;

a second defining portion defining a basic delay time calculated by dividing the predetermined pulse width by a predetermined integer, wherein the predetermined integer is at least 2; and a placing portion placing the pulse signals in the symbol time by delaying the pulse signals by an integral multiple of the basic delay time from start of the symbol time, the overall number of the pulse signals in the symbol time being k and $0 \leq k \leq N$ being satisfied, wherein the receiver includes:

a reproducing portion reproducing the data in accordance with the combination of placing the pulse signals in the symbol time of the received transmission signal.

5. The pulse transmission system according to claim 4, wherein the pulse signals represent a multilevel code by a combination of the placing.

6. The pulse transmission system according to claim 4, wherein the pulse signals are transmitted as radio signals.

7. The pulse transmission system according to claim 4, wherein the symbol time is N times the predetermined pulse width.

8. The pulse transmission system according to claim 4, wherein the second defining portion comprises:

a pulse number signal generating unit for generating a pulse number signal;

a timing control signal generating unit for generating a timing control signal; and the transmitter further comprises:

a multiphase clock generating unit for outputting multiphase clocks of different phases;

a selector to select one of the multiphase clocks by using the pulse number signal and the timing control signal; and a pulse generator for generating the pulse signals by using the clock selected by the selector.

9. The pulse transmission system according to claim 8, wherein the transmitter further comprises a bandpass filter for converting the pulse signals to the transmission signal.

10. The pulse transmission system according to claim 9, wherein the transmitter further comprises a transmission amplifier for amplifying the transmission signal.

11. A pulse transmitter for converting transmission data to a transmission signal including pulse signals, each having a predetermined pulse width, and outputting the transmission signal, comprising:
a first defining portion defining a symbol time N times or more the predetermined pulse width, N being 2 or more;
a second defining portion defining a basic delay time calculated by dividing the predetermined pulse width by a predetermined integer, wherein the predetermined integer is at least 2;
a placing portion placing the pulse signals in the symbol time by delaying the pulse signals by an integral multiple of the basic delay time from start of the symbol time so as to convert the transmission data to a transmission signal, the overall number of the pulse signals in the symbol time being k and $0 \leq k \leq N$ being satisfied; and
an outputting portion for outputting the transmission signal.

12. The pulse transmitter according to claim 11, wherein the pulse signals represent multilevel code by a combination of the placing.

13. The pulse transmitter according to claim 11, wherein the pulse signals are transmitted as radio signals.

14. The pulse transmitter according to claim 11, wherein the symbol time is N times the predetermined pulse width.

15. The pulse transmitter according to claim 11, further comprising a bandpass filter for converting the pulse signals to the transmission signal.

16. The pulse transmitter according to claim 15, further comprising a transmission amplifier for amplifying the transmission signal.

17. The pulse transmitter according to claim 11, wherein the second defining portion comprising:
a pulse number signal generating unit for generating a pulse number signal;
a timing control signal generating unit for generating a timing control signal; and
the pulse transmitter further comprises;
a multiphase clock generating unit for outputting multiphase clocks of different phases;
a selector to select one of the multiphase clocks by using the pulse number signal and the timing control signal; and
a pulse generator for generating the pulse signals by using the clock selected by the selector.

18. A receiver to receive a transmission signal including pulse signals, each having a predetermined pulse width, and reproduce data based on the received transmission signal, comprising:
a first defining portion defining a symbol time N times or more the predetermined pulse width, N being 2 or more;
a second defining portion defining a basic delay time calculated by dividing the predetermined pulse width by a predetermined integer, wherein the predetermined integer is at least 2; and
a reproducing portion reproducing the data based on a combination of placing the pulse signals in the symbol time by delaying the pulse signals by an integral multiple of the basic delay time from start of the symbol time, the overall number of the pulse signals in the symbol time being k and $0 \leq k \leq N$ being satisfied.

19. The receiver according to claim 18, wherein the pulse signals are received as radio signals.

* * * * *